US012103723B2

(12) United States Patent
Huysmans et al.

(10) Patent No.: US 12,103,723 B2
(45) Date of Patent: Oct. 1, 2024

(54) DEVICE FOR DISPENSING SINGLE DROPLETS INTO A CAP OR BODY OF A CAPSULE

(71) Applicant: Capsugel Belgium NV, Bornem (BE)

(72) Inventors: Tom Huysmans, Bornem (BE); Nigel Harrison, Linton (GB); Roko Hrastov, Bornem (BE)

(73) Assignee: Capsugel Belgium NV (BE)

(*) Notice: Subject to any disclaimer, the term of this patent is extended or adjusted under 35 U.S.C. 154(b) by 44 days.

(21) Appl. No.: 18/247,633

(22) PCT Filed: Sep. 30, 2021

(86) PCT No.: PCT/EP2021/076995
§ 371 (c)(1),
(2) Date: Mar. 31, 2023

(87) PCT Pub. No.: WO2022/069660
PCT Pub. Date: Apr. 7, 2022

(65) Prior Publication Data
US 2023/0391486 A1 Dec. 7, 2023

(30) Foreign Application Priority Data
Oct. 2, 2020 (EP) .................................... 20199959

(51) Int. Cl.
*B65B 39/00* (2006.01)
*A61J 3/07* (2006.01)
(Continued)

(52) U.S. Cl.
CPC ............. *B65B 51/023* (2013.01); *A61J 3/072* (2013.01); *B65B 7/2871* (2013.01); *B65B 51/10* (2013.01); *B65B 51/32* (2013.01)

(58) Field of Classification Search
CPC ........ A61J 3/072; B65B 51/023; B65B 51/10; B65B 51/32; B65B 7/2871
See application file for complete search history.

(56) References Cited

U.S. PATENT DOCUMENTS 4,193,406 A * 3/1980 Jinotti ............... A61M 16/0009 128/205.24
4,403,461 A * 9/1983 Goutard ................. A61J 3/072 53/900
(Continued)

FOREIGN PATENT DOCUMENTS

WO WO 2005/016783 2/2005
WO WO 2010/123800 10/2010

OTHER PUBLICATIONS

International Search Report and Written Opinion, mailed Nov. 30, 2021, issued for International Patent Application No. PCT/EP2021/076995, 10 pages.

*Primary Examiner* — Andrew M Tecco
(74) *Attorney, Agent, or Firm* — Klarquist Sparkman, LLP

(57) ABSTRACT

The present invention relates to a device for dispensing a single droplet of a fluid, for example a single droplet of an adhesive, onto the inside surface of a cap or onto the inside surface of a body of a capsule, this is useful for rendering a closed capsule with a telescopically engaged cap and body more tamperproof, or for fixing a cap or a body or both, which encloses a caplet or tablet or a part thereof, to the caplet or the tablet.

26 Claims, 21 Drawing Sheets

15a 15b

(51) Int. Cl.

| | |
|---|---|
| ***B65B 7/28*** | (2006.01) |
| ***B65B 51/02*** | (2006.01) |
| ***B65B 51/10*** | (2006.01) |
| ***B65B 51/32*** | (2006.01) |

(56) References Cited

U.S. PATENT DOCUMENTS

| | | | | | |
|---|---|---|---|---|---|
| 4,631,055 | A * | 12/1986 | Redl | A61B 17/00491 604/82 |
| 4,899,516 | A * | 2/1990 | Krieger | A61J 3/072 118/317 |
| 4,902,281 | A * | 2/1990 | Avoy | B05B 1/26 222/137 |
| 5,656,035 | A * | 8/1997 | Avoy | B05B 1/26 141/2 |
| 6,884,230 | B1 * | 4/2005 | Epstein | A61B 17/00491 604/82 |
| 2011/0084094 | A1 * | 4/2011 | Reidt | B05C 17/00579 222/137 |
| 2012/0064482 | A1 * | 3/2012 | Boehm | A61C 5/62 222/536 |

* cited by examiner

9b

9a

10b

10a

DEVICE FOR DISPENSING SINGLE DROPLETS INTO A CAP OR BODY OF A CAPSULE

CROSS REFERENCE TO RELATED APPLICATIONS

This is the U.S. National Stage of International Application No. PCT/EP2021/076995, filed Sep. 30, 2021, which was published in English under PCT Article 21(2), which in turn claims the benefit of European Patent Application No. 20199959.6, filed Oct. 2, 2020. The prior applications are incorporated herein by reference in their entirety.

FIELD OF THE INVENTION

The present invention relates to a device, DEV, for dispensing a single droplet of a fluid, for example a single droplet of an adhesive, onto the inside surface of a cap or onto the inside surface of a body of a capsule. This is useful for rendering a closed capsule with a telescopically engaged cap and body more tamperproof, or for fixing a cap or a body or both, which encloses a caplet or tablet or a part thereof, to the caplet or the tablet.

BACKGROUND OF THE INVENTION

Standard containers for pharmaceutical or other substances in solid form may be capsule shells which have two parts, a cap part, also called cap, and a body part, also called body.

Such capsules are used inter alia for containing a substance in solid form, such as powders, caplets or tablets.

The cap and the body may telescopically engage with each other for closing the capsule. The telescopic engagement of the cap and the body when the capsule is closed, is realized in form of an overlap of a part of the cap over a part of the body.

In order to avoid an unintentional opening of the filled capsule, that is an unintentional separation of the cap and the body of a filled capsule, which would lead to a spilling of the content of the capsule, it is desired to make the capsule tamperproof by applying an adhesive into the overlapping region, which glues the cap to the body.

When the capsule contains a caplet or a tablet, the cap encloses one side of the caplet or tablet and the body encloses the other side of the caplet or tablet. Both the cap and the body should not fall off from the caplet or the tablet.

U.S. Pat. No. 4,403,461 discloses an apparatus for dispensing adhesive onto the inside of a cap of a capsule. The adhesive is first fed into an internal groove 32 of a slide 9 through bores 15 of a piston 14. Then the adhesive is transferred from the internal groove 32 onto a membrane 29 of an adhesive take-up and transfer member 26, then the adhesive is transferred from the membrane onto the inside of a cap. This way of applying an adhesive onto the inside of a cap requires an intermediate depository between the dispensing openings of the bores 15 and the inside of the cap in form of this transfer member 26, which needs to make contact with the surface of the dispensing openings of the bores 15 and with the inside of the cap. Furthermore, the feeding of the adhesive into the internal groove 32 results in an excess of adhesive in the groove 32 which needs to be removed by an overflow valve 32.

U.S. Pat. No. 5,188,688 discloses the sealing of a capsule containing a caplet 20 wherein the sealing is effected by a drop 26 of a sealant. For the sealing the body 12 of the capsule contains the caplet 20 and the drop 26 of the sealant is placed onto the caplet 20. Alternatively, if the sealant drop 26 is of sufficient viscosity, it may be placed at the junction 24 between the edge of the body 12 and the caplet 20 and shall remain essentially in place until the cap 14 is mated with the body 12. When the cap 14 slides over the caplet 20 the sealant drop is spread between the inner side wall 19 of the cap 14 and the caplet 20 and between the overlap between the inner side wall 19 of the cap 14 and the outer side wall 17 of the body 12 providing a sealant spread 28. The adhesive drop 26 may be administered by a pressurized metered dropper such as a commercially available syringe. The method is applicable only to a body filled with a caplet and the disclosure is silent about any possibility to apply the sealant drop in an automated way by means of an apparatus.

U.S. Pat. No. 4,539,060 discloses in FIG. 4 an embodiment for sealing gelatin capsules wherein the sealing fluid 6, or a steam thereof, is sprayed before the capsule 4 is telescopically joined by a spray nozzle 13 which sprays the sealing fluid 6, or a steam thereof, into the open end 15 and/or onto the inside of the side walls 16 of the cap part 17 of the capsule 4. The nozzle 13 is located outside of the cap part 17. The nozzle may be a jet nozzle or a high frequency pressure pulse jet nozzle, and in the embodiment shown in FIG. 4 not individual droplets are dispensed by the nozzle but the sealing fluid is applied in form of a spray. So neither the amount of dispensed fluid can be controlled properly, nor the position onto which a droplet shall be applied. The examples disclose only the sealing of capsules after joining the cap and the body.

There was a need for an apparatus which allows the controlled dispensing of droplets onto the inner surface of the wall of the cap of a capsule or onto the inner surface of the wall of the body of a capsule; for example onto the inner surface of the wall of the cap of a capsule in the region of the inner surface of the wall of the cap where the cap will overlap with the body once the cap is slid over the body after the filling of the body for closing the capsule.

The apparatus should allow for

- dispensing a single droplet of an adhesive,
- dispensing the droplet onto the inner surface of the wall of the cap or onto the inner surface of the wall of the body, for example onto the inner surface of the wall of the cap in the region of overlap of the cap with the body once closed,
- dispensing the droplet in a controlled way with respect to the direction of the dispensing and with respect to the size of the droplet and with respect to the position in the inner surface of the wall onto which the droplet shall be applied,
- dispensing the droplet with at a temperature different from ambient temperature, such as a temperature higher or lower than ambient temperature,
- dispensing the droplet without requiring physical contact of dispensing parts with the wall of the cap or of the body,
- manufacture of capsules with a telescopically engaged cap and body, which has an increased pull-apart force of the cap from the body compared to a similar capsule but manufactured without dispensing of a droplet of an adhesive;
- manufacture of a capsule containing a caplet or a tablet, wherein the caplet or the tablet is at least partially enclosed by the cap or the body or both and wherein the cap or the body or both are glued to the enclosed caplet or tablet by a droplet of an adhesive dispensed onto the inner surface of the wall of the cap or onto the inner surface of the wall of the body respectively, thereby effecting an increased pull-apart force of the cap or of the body respectively from the enclosed caplet or tablet compared to a similar capsule manufactured without said dispensing of a droplet of an adhesive.

The invention relates to a certain device which allows for the dispensing of a droplet in the desired way.

SUMMARY OF THE INVENTION

Subject of the invention is a device, DEV, for dispensing a droplet of a fluid, FLU, onto the inner surface of a cap or onto the inner surface of a body of a capsule;

- the device, DEV, comprises a cannula, a fluid dispensing cavity and a valve; the cannula is a tube with two ends which are both open;
- one of the two ends of the cannula dispenses the droplet of the fluid, FLU;
- the valve comprises an outlet channel which ends with an open end;
- the other end of the two ends of the cannula and the open end of the outlet channel of the valve open into the fluid dispensing cavity,
- the valve thereby is fluid connection via its outlet channel and then via the fluid dispensing cavity and then via the cannula with the open end of the cannula, and the fluid, FLU, flows from the valve via said fluid connection to the open end of the cannula.

Abbreviations

The following abbreviations are used in this specification:

- APP apparatus for dispensing droplets of FLU onto the inside surface of a cap or onto the inner surface of a body of a capsule and used in the closing process of caps and bodies to form closed capsules or used in the insertion of a tablet or a caplet into a cap or into a body
- DEV a device for dispensing a droplet of FLU onto the inner surface of a cap of a capsule or onto the inner surface of a body of a capsule
- FLU fluid which is dispensed by DEV in a form of a droplet
- HPMC hydroxypropyl methylcellulose, also called hypromellose or Cellulose, 2-hydroxypropyl methyl ether or cellulose hydroxypropyl methyl ether, CAS 9004-65-3
- HPMCAS hydroxypropyl methylcellulose acetate succinate, hypromellose acetate succinate
- ID inner diameter
- ms, msec millisecond
- OD outer diameter
- SMLD Sub-Micro-Liquid-Dispenser
- V-OUTLETCHAN volume of the outlet channel of the valve ending in the fluid dispensing cavity
- V-CAV volume of the fluid dispensing cavity
- wt % (w/w), weight percent

DETAILED DESCRIPTION OF THE INVENTION

The terms "capsule" and "capsule shell" are often used interchangeably, also in this invention, sometimes, for example in prior art publications, a distinction is made, and then usually the term "capsule shell" means the empty capsule and the term "capsule" means the capsule filled with a pharmaceutical or some other substance.

The term "inner surface of the cap or of the body" means "inner surface of the wall of the cap or of the body" and are used interchangeably, if not stated explicitly otherwise.

A typical cap of a capsule comprises two parts, a closed end, which is often dome shaped, and a part, usually of cylindrical shape, which abuts the closed end and which ends with the open end of the cap, this open end is a rim enclosing the opening of the cap, it can also be called the edge of the open end of the cap.

Likewise a typical body of a capsule comprises similar two part, a closed end, which is often dome shaped, and a part, usually of cylindrical shape, which abuts the closed end and which ends with the open end of the body, this open end is a rim enclosing the opening of the body, it can also be called the edge of the open end of the body.

Telescopic engagement in the sense of this invention means an at least partial contact of the inner wall of the cap with the outer wall of the body. It also means that cap and body overlap in a closed capsule, and where they overlap in the closed position, they show an at least partial fit of their forms. The telescopic engagement of the cap and the body may be realized by sliding the cap over the body, in other words by inserting the body into the cavity of the cap. The body is slid with the open end first into the cavity of the cap. Thereby the cap and the body are at least partially form fittingly connected or engaged. So telescopic engagement means an at least partial form fitting engagement of the cap with the body.

The outer diameter of the cylindrical part of the body is equal to or slightly smaller than the inner diameter of the cylindrical part of the cap. When the capsule is closed by telescopic engagement of the cap with the body, at least part of the, preferably cylindrical, part of the cap slides over at least part of the, preferably cylindrical, part of the body, thereby a region of overlap is defined, where at least a part of the wall of the, preferably cylindrical, part of the cap overlaps with at least a part of the wall of the, preferably cylindrical, part of the cap. A closed capsule shell may have an essentially hollow-cylindrical shape.

In case of a caplet or a tablet there may be various way to enclosed parts or all of the caplet or tablet by an outer shell: only one end of the caplet or tablet may be enclosed by a shell, in this case the shell may be seen as either a cap or a body of a capsule shell. Or both ends of the caplet or the tablet may be enclosed each by a shell, in this case the shell enclosing the one end of the caplet or tablet may be seen as a cap of a capsule shell, and the other shell enclosing the other end of the caplet or tablet may be seen as a body of a capsule shell. When both ends of a caplet or a tablet are enclosed each by a shell, then

- the open ends, that is the edges of the open ends, of the two shells may be apart from each other when they enclose their respective end of the caplet or the tablet; or
- the open ends, that is the edges of the open ends, of the two shells may abut each other when they enclose their respective end of the caplet or the tablet; or
- the open ends of the two shells may telescopically engage with each other as described herein.

The device, DEV may comprise a pin;

- the pin has two ends;
- the pin head is one of the two ends of the pin;
- the pin comprises a pin tube that serves as the container for the cannula and comprises in its inside the cannula;
- the one of the two ends of the cannula, which dispenses the droplet of the fluid, FLU, is located in the pin head.

The volume, V-CAV, of the fluid dispensing cavity may be 0.01 microliter or larger, preferably 0.05 microliter or larger, more preferably 0.075 or larger.

The volume, V-CAV, of the fluid dispensing cavity may be 5 microliter or smaller, preferably 4 microliter or smaller, more preferably 3 microliter or smaller.

Any of the lower limit of the possible volume, V-CAV, of the fluid dispensing cavity may be combined with any of the upper limit of the volume, V-CAV, of the fluid dispensing cavity. For example, the volume, V-CAV, of the fluid dispensing cavity may be from 0.01 to 5 microliter, preferably from 0.05 to 5 microliter, more preferably from 0.075 to 5 microliter, even more preferably from 0.075 to 4 microliter, especially from 0.075 to 3 microliter, more especially from 0.075 to 2.5 microliter, even more especially from 0.1 to 2.5 microliter, in particular 0.075 to 2 microliter, more in particular 0.075 to 1.5 microliter.

The volume, V-CAV, of the fluid dispensing cavity does not comprise the volume, V-OUTLETCHAN, of the outlet channel of the valve ending in the fluid dispensing cavity; rather the outlet channel with its volume, V-OUTLETCHAN, is part of the valve.

The volume, V-OUTLETCHAN, of the outlet channel of the valve may be for example 0.07 microliter in case of an inner diameter of the outlet channel of 0.3 mm and a length of the outlet channel of 1 mm.

DEV is a device for dispensing at least one individual droplet. The droplet is dispensed from the cannula. More than one individual droplets may be dispensed consecutively from DEV, that is from the cannula. If more than one droplet is dispensed from DEV, than each droplet is dispensed by an individual action of DEV which individual action dispenses one individual droplet independently from any other dispensing of a droplet. This is an advantage of DEV compared to nozzles which spray FLU onto the inner surface of the wall, since spraying means the dispensing of a multitude of droplets, wherein the droplets are not dispensed individually and also cannot be dispensed individually in a controlled way.

The choice of a minimized volume, V-CAV, of the fluid dispensing cavity provides for a minimization of pressure variations which can occur when the valve opens and the dead volume between the opening of the valve and the cannula is too large. Thereby single, that is individual droplets can be dispensed in a controlled fashion with out sputtering, without the formation of an undesired droplet hanging at the outside of the opening of the cannula, not having been properly ejected.

Furthermore DEV allows for a dispensing in form of an ejection of the droplet, thereby the droplet flies through the space between the cannula and the inner surface of the wall, the dispensing is thereby done without contact of the cannula with the inside surface of the wall, also without a contact mediated by a droplet which is simultaneously in connection with the cannula and with the inner surface of the wall. A minimized volume, V-CAV, of the fluid dispensing cavity contributes to this desired feature of DEV, the contactless application of a droplet onto the inner surface of the wall.

The fluid dispensing cavity serves for a connection of the outlet channel of the valve with the cannula. In case that DEV comprises more than one cannula then the fluid dispensing cavity serves for the distribution of FLU from the outlet channel of the valve to the individual cannulas. Thereby one valve can feed one or more cannulas without necessitating for example one separate valve for each cannula.

Whereas the pin head is one of the two ends of the pin, the other end of the pin is called pin foot herein.

The pin tube may be a closed tube with an opening in the pin foot. The pin may have an opening in the pin head.

Preferably the inner and the outer diameter of the pin tube are constant over the length of the pin tube.

Preferably the outer diameter of the pin head is equal to the outer diameter of the pin tube.

Preferably the outer diameter of the pin is constant over the length of the pin.

The OD of the pin tube may be 15 mm or smaller, preferably 12.5 mm or smaller, more preferably 10 mm or smaller, even more preferably 9.6 mm or smaller.

The OD of the pin tube may be 2 mm or larger, preferably 2.5 mm or larger, more preferably from 2.75 mm or larger.

Any of the lower limit of the possible OD of the pin tube may be combined with any of the upper limit of possible OD of the pin tube.

For example, the OD of the pin tube may be from 2 to 15 mm, preferably from 2.5 to 12.5 mm, more preferably from 2.5 to 10 mm, even more preferably from 2.5 to 9.6 mm The thickness of the wall of the pin tube may be from 0.1 to 1 mm, preferably from 0.1 to 0.8 mm, more preferably from 0.1 to 0.6 mm.

The dimensions of the pin tube and of the pin head respectively may be chosen in relation to the ID of the cap or the body, into which the pin is inserted for dispensing the droplet.

Sizes of the cap may vary, exemplary dimensions for the TD of the cap and possible sizes of the GD and of the ID of the pin tube may be as given in Table 1 for a possible thickness of the wall of the pin tube of 0.2 mm.

TABLE 1

| Capsule Size | ID cap [mm] | Pin Tube Min OD [mm] | Pin Tube Max OD [mm] | Pin Tube Min ID [mm] | Pin Tube Max ID [mm] |
|---|---|---|---|---|---|
| 000 | 9.7 | 3 | 9.5 | 2.6 | 9.1 |
| 00 | 8.3 | 3 | 8.1 | 2.6 | 7.7 |
| 0 | 7.4 | 3 | 7.2 | 2.6 | 6.8 |
| 1 | 6.7 | 3 | 6.5 | 2.6 | 6.1 |
| 2 | 6.1 | 3 | 5.9 | 2.6 | 5.5 |
| 3 | 5.6 | 3 | 5.4 | 2.6 | 5.0 |
| 4 | 5.1 | 3 | 4.9 | 2.6 | 4.5 |
| 5 | 4.7 | 3 | 4.5 | 2.6 | 4.1 |

Sizes of the body may vary, exemplary dimensions for the ID of the body and possible sizes of the GD and of the TD of the pin tube may be as given in Table 2 for a possible thickness of the wall of the pin tube of 0.2 mm.

TABLE 2

| Capsule Size | ID body [mm] | Pin Tube Min OD [mm] | Pin Tube Max OD [mm] | Pin Tube Min ID [mm] | Pin Tube Max ID [mm] |
|---|---|---|---|---|---|
| 000 | 9.4 | 3 | 9.2 | 2.6 | 8.8 |
| 00 | 8 | 3 | 7.8 | 2.6 | 7.4 |
| 0 | 7.1 | 3 | 6.9 | 2.6 | 6.5 |
| 1 | 6.4 | 3 | 6.2 | 2.6 | 5.8 |
| 2 | 5.8 | 3 | 5.6 | 2.6 | 5.2 |
| 3 | 5.4 | 3 | 5.2 | 2.6 | 4.8 |
| 4 | 4.9 | 3 | 4.7 | 2.6 | 4.3 |
| 5 | 4.5 | 3 | 4.3 | 2.6 | 3.9 |

The pin tube in DEV may be exchangeable in order to mount pin tubes with different sizes and OD. A pin tube with a small OD may also be used for more than one capsule sizes with larger ID of the cap or body than the OD of the pin tube. For example, a pin tube with an OD from 3 to 4.3 mm may be used for all sizes of caps and body between size 5 and 000.

In one embodiment, the OD of the pin tube is 4 mm.

In one embodiment, the thickness of the wall of the pin tube is 0.4 or 0.5 mm.

In one embodiment, the ID of the pin tube is 3.0 mm.

In one embodiment, the OD of the pin tube is 4 mm and the ID of the pin tube is 3.0 mm.

The cannula may extend at least over the length of the pin.

The cannula may be a round tube.

Preferably the inner and the outer diameter of the cannula are constant over the length of the cannula.

The OD of the cannula may be 0.1 mm or larger, preferably 0.12 mm or larger, more preferably 0.14 mm or larger.

The OD of the cannula may be 3 mm or smaller, preferably 2 mm or smaller, more preferably 1 mm or smaller, even more preferably 0.9 mm or smaller, especially 0.8 mm or smaller.

Any of the lower limit of the possible OD of the cannula may be combined with any of the upper limit of possible OD of the cannula.

For example, the OD of the cannula may be from 0.1 to 3 mm, preferably from 0.1 to 2 mm, more preferably from 0.1 to 1 mm, even more preferably from 0.1 to 0.9 mm, especially from 0.1 to 0.8 mm, more especially from 0.12 to 0.8 mm, even more especially from 0.14 to 0.8 mm.

The ID of the cannula may be 0.02 mm or larger, preferably 0.03 mm or larger, more preferably 0.04 mm or larger.

The ID of the cannula may be 2 mm or smaller, preferably 1 mm or smaller, more preferably 0.8 mm or smaller, even more preferably 0.6 mm or smaller, especially 0.5 mm or smaller.

Any of the lower limit of the possible ID of the cannula may be combined with any of the upper limit of possible ID of the cannula.

For example, the ID of the cannula may be from 0.02 to 2 mm, preferably from 0.02 to 1 mm, more preferably from 0.02 to 0.8 mm, even more preferably from 0.02 to 0.6 mm, especially from 0.03 to 0.6 mm, more especially from 0.04 to 0.6 mm, even more especially from 0.04 to 0.5 mm.

If the ID of the cannula becomes too small, then the pressure that needs to be applied may become too high, or the opening time of the valve may become too long for the dispensing of a droplet.

If the ID of the cannula becomes too large, then the pressure that needs to be applied may become too low, or the opening time of the valve may become too short for the dispensing of a droplet.

Also if the ID of the cannula becomes too large, then the velocity of FLU during the dispensing of the droplet may become too low so that the droplet no longer projects from the opening of the cannula in a clean way with complete and clean detachment of the droplet from the cannula. Also the droplet may no longer follow a straight trajectory once it has detached from the cannula, but for example may rather sort of drop down due to a velocity which is too low.

In one embodiment, the OD of the cannula is 0.413 mm.

In one embodiment, the thickness of the wall of the cannula is ca. 0.11 mm.

In one embodiment, the ID of the cannula is 0.21 mm.

In one embodiment, the OD of the cannula is 0.413 mm and the ID of the cannula is 0.21 mm.

The pin foot may be mounted in a pin socket. The pin socket may comprise the fluid dispensing cavity. The end of the cannula which opens into the fluid dispensing cavity may be mounted to a mount, herein called cannula mount. The cannula mount may comprise the fluid dispensing cavity. The pin socket may comprise the cannula mount, or the cannula mount and pin socket may be two separate parts, with the cannula mount mounted to the pin socket, for example by a screw type connection.

In one embodiment, the pin socket and the cannula mount are separate parts, the cannula mount is mounted to the pin socket, preferably by a screw type connection; the cannula mount comprises the fluid dispensing cavity and mounts the end of the cannula, which opens into the fluid dispensing cavity, to the fluid dispensing cavity.

The cannula may extend from the pin socket, preferably from the cannula mount, into the pin tube and in the pin tube to the pin head.

The valve may be any type of valve which is capable of dispensing small volumes of a fluid in a controlled way. Typical valves are known to the skilled person as micro valves, also called Sub-Micro-Liquid-Dispensers SMLD. Such valves are capable of dispensing small volumes in the micro- and nanoliter range, even down to 10 nanoliter and less. They may be actuated electromagnetically. Typically, such valves comprise a valve cavity containing the fluid that is to be dispensed in a controlled fashion, a valve seat, also called valve nozzle, which may contain the outlet channel, and which serves as a seat for a valve ball closing the one end of the outlet channel. The other end of the outlet channel is the open end of the valve where the fluid leaves the valve. The fluid in the valve cavity is usually kept under pressure. The valve ball is pressed against the valve seat by a mobile anchor by action of a closing spring on the mobile anchor. By a current fed through a valve coil, the mobile anchor with the valve ball is magnetically pulled by the magnetic field of a stationary anchor, thereby the valve opens, that is the one end of the outlet channel is opened and the fluid, due to the applied pressure, is forced into and enters the outlet channel and emerges from the other end of the outlet channel which is an open end. Such valves are available on the market e.g. from Fritz Gyger AG, 3645 Thun-Gwatt, Switzerland.

The opening time of the valve may be 0.1 msec or more, preferably 0.2 msec or more, more preferably 0.3 msec or more, even more preferably 0.4 msec or more.

The opening time of the valve may be 30 msec or less, preferably 26 msec or less, more preferably 22 msec or less, even more preferably 20 msec or less, especially 15 msec or less, more especially 10 msec or less.

Any of the lower limit of the possible opening time of the valve may be combined with any of the upper limit of possible opening time of the valve.

For example, the opening time of the valve may be from 0.1 to 30 msec, preferably from 0.2 to 26 msec, more preferably from 0.3 to 22 msec, even more preferably from 0.4 to 20 msec.

In one embodiment, the opening time of the valve may be from 0.5 to 3 msec.

FLU in the valve may be pressurized; the pressure may be from 0.2 to 6 bar, preferably from 0.3 to 5 bar, more preferably from 0.4 to 4 bar, even more preferably from 0.5 to 3 bar, especially from 1 to 2 bar.

The valve may be mounted to the cannula mount in such a way that the outlet channel of the valve ending in the fluid dispensing cavity abuts the fluid dispensing cavity. In one embodiment the cannula mount comprises the fluid dispensing cavity, the cannula mount is mounted to the pin socket as a part from separate the pin socket, the valve is mounted by a valve mount to the pin socket in such a way that the outlet channel of the valve ending in the fluid dispensing cavity abuts the fluid dispensing cavity in the cannula mount.

The pin has a longitudinal axis in the direction of the extension of the pin. This direction is herein also called longitudinal direction. The extension of the cannula inside of the pin is along this longitudinal axis of the pin. The part of the cannula in the pin head may be straight, that is without a bend, or it may be bended. This can be chosen according to the location where a droplet is desired to be placed onto the surface of the cap or of the body. The bending may be located in the pin head. The bending may be with a certain angle against the longitudinal axis of the pin head, which angle is called bending angle herein, thereby the direction of the opening of the cannula has an angle against the longitudinal axis of the pin. Preferably a bending angle of the bending of the cannula in the pin head is from 40 to 140°, more of preferably from 50 to 130°, even more preferably from 70 to 110°, especially from 85 to 95°, more especially the bending angle is 90°, with 900 bending angle the direction of the opening of the cannula is perpendicular to longitudinal axis of the pin, that is perpendicular to the surface of the pin.

The droplet that is dispensed from the opening of the cannula leaves the cannula in the direction of the opening of the cannula.

DEV is a device for dispensing a droplet of FLU onto the inner surface of a cap or onto the inner surface of a body of a capsule at any desired location of the inner surface of the cap or of the body respectively; if required by the desired location where the droplet shall be deposited on the inner surface of the cap or of the body, a bending angle may be chosen respectively.

In an embodiment of the invention, DEV is a device for dispensing a droplet of FLU onto the inner surface of a cap of a capsule in the region of said inner surface of a cap where the cap will overlap with the body of the capsule once the cap is slid over the body for closing the capsule.

The cannula in the pin head, any bend of the cannula in the pin head and the end of the cannula with the opening of the cannula may be fixed in the pin head. The pin head may comprise a mount for fixing the cannula, that is for fixing the position of the cannula, the position of the bend of the cannula in the pin head, and the position of the opening of the cannula in the pin head.

The end of the cannula with the opening of the cannula in the pin head ends in an opening in the wall of the pin, that is of the pin head. This opening is called the pin head opening. The pin head opening may have any shape such as a rectangular or round shape such as a round hole, it may have the same shape as the cannula. When the cannula is a round tube then preferably the pin head opening is a round hole. The inner diameter of the pin head opening may be the same or larger than the outer diameter of the cannula, preferably it is larger, especially in the case when the pin head opening is round hole and the cannula is a round tube. Preferably the end of the cannula with the opening of the cannula is circumferentially separated from the wall of the pin head by an open space. That means that the pin head opening comprises the end of the cannula with the opening of the cannula and this open space separating the end of the cannula circumferentially from the wall of the pin head.

Through the pin head opening gas can flow out of the pin head from the inside of the pin head. When said open space separates the end of the cannula circumferentially from the wall of the pin head, then the end of the cannula will be circumferentially engulfed by the outflowing gas; the gas flows around the end of the cannula.

Preferably the position of the end of the cannula with the opening of the cannula is in the middle of the pin head opening.

The end of the cannula with the opening of the cannula in the pin head opening preferably does not extend beyond the outer surface of the pin, or beyond the outer surface of the pin head respectively. So the end of the cannula with the opening of the cannula preferably does not stick out of the pin head opening or out of the pin.

The end of pin, that is the end of the pin head may be closed. The pin head may comprise a cap which closes the pin, it is called pin head closure cap. Thereby the opening of the pin head may be the open space that separates the end of the cannula from the wall of the pin head in case that the inner diameter of the opening in the wall of the pin head is larger than the outer diameter of the cannula; this opening of the pin head may be the only opening of the pin head.

The pin head closure cap may comprise the means, such as in form of a mount, for fixing the cannula, that is for fixing the position of the cannula, the position of the bend of the cannula in the pin head, and the position of the opening of the cannula in the pin head.

So the pin head may comprise the end of the cannula with the bending of the end of the cannula, a pin head closure cap and a mount for fixing the position of the cannula and the position of the opening of the cannula.

In one embodiment, the device, DEV, comprises only one cannula.

In case that DEV comprises only one cannula, then the fluid dispensing cavity has a cross sectional area perpendicular to the longitudinal axis of the cannula, wherein

- this cross sectional area of the fluid dispensing cavity may be different from the cross sectional area of one cannula;
- preferably, this cross sectional area of the fluid dispensing cavity is larger than the cross sectional area of one cannula.

In another embodiment, the device, DEV, may comprise more than one cannula.

Preferably, the device, DEV, comprises 1, 2, 3, 4, 5, 6, 7 or 8 cannulas, more preferably 1, 2, 3 or 4 cannulas, even more preferably 2, 3 or 4 cannulas, especially 2 or 4 cannulas.

When DEV comprises more than one cannula, then

- the pin serves as the container of the cannulas and comprises in its inside all the cannulas;
- each cannula is a tube with two ends which are both open; preferably the cannulas are identical;
- the pin head comprises every one of the two ends of each the cannula;
- the pin head comprises a pin head opening for each cannula; preferably the pin head comprises for each cannula one separate pin head opening;
- each other end of the cannulas open into the fluid dispensing cavity,
- the valve thereby is in fluid connection via its outlet channel and the via the fluid dispensing cavity and then via each cannula with each of the open ends of the cannulas in the pin head.

When DEV comprises more than one cannula, then each cannula may extend at least over the length of the pin.

But also in case that DEV comprises more than one cannula, then the fluid dispensing cavity has a cross sectional area perpendicular to the longitudinal axis of the cannula, wherein this cross sectional area of the fluid dispensing cavity may be different from the cross sectional area of one cannula;

preferably, this cross sectional area of the fluid dispensing cavity is larger than the cross sectional area of one cannula.

When DEV comprises more than one cannula, then the end parts of all cannulas, which are located in the pin head, may by bended. Preferably, when all cannulas are bended in the pin head then all bends have the same degree of bending. The degree of the bending may be as described herein for the embodiment with one cannula, also with all the embodiments of the degree of the bending; preferably all cannulas have a bending in the pin head of 90° against the longitudinal axis of the pin. This means that the direction of the opening of each cannula has an angle against the longitudinal axis of the pin, preferably of 90°.

Preferably the cannulas are arranged in such a way that their openings, which are located in the pin head, and the direction of their openings are distributed over the circumference of the pin head, preferably they are circumferentially distributed over the circumference of the pin head with equal distance to each other, that is the direction of their openings have the same angle to each other. So preferably, the cannulas are arranged in such a way that their openings, which are located in the pin head, and the direction of their openings are distributed over the circumference of the pin head at the same angle to each other.

In case of a DEV with two cannulas the direction of the openings, which are located in the pin head, of the two cannulas have preferably an angle of 180° to each other, that is the openings, which are located in the pin head, are on opposite sides of the pin head.

In case of a DEV with three cannulas the direction of the openings, which are located in the pin head, of the three cannulas have preferably an angle of 120° to each other.

In case of a DEV with four cannulas the direction of the openings, which are located in the pin head, of the four cannulas have preferably an angle of 90° to each other.

When DEV comprises more than one cannula, then preferably the mount in the pin head fixes the position of all the cannulas and of their openings in the pin head.

FLU may be a fluid adhesive.

FLU may comprise a solvent SOLV, SOLV may be selected from the group consisting of water, $C_{1-4}$ alcohol, $C_{1-4}$ ether, $C_{1-8}$ ketones, methylenglycol, $C_{1-4}$ carboxylic acid $C_{1-4}$ ester; preferably SOLV is water, EtOH, isopropanol, or a mixture thereof.

Embodiments of SOLV are water, EtOH, isopropanol, from 70 to 80 wt % aqueous EtOH, from 20 to 30 wt % aqueous EtOH, and from 30 to 50 wt % aqueous isopropanol.

Specific embodiments of SOLV are water, EtOH, isopropanol, 75 wt % aqueous EtOH, 25 wt % aqueous EtOH, and 40 wt % aqueous isopropanol.

FLU may comprise an adhesive agent ADHESAG, ADHESAG may be selected from the groups consisting of polyalkylene, polysaccharide, cellulose and derivatives of cellulose, wax chitosan, carbohydrates including mono-, di-, and poly saccharides, aspartame, glycoside, polyvinylpyrrolidone, gelatin, monofunctional organic acid, polyfunctional organic acid, polymers and copolymers of acrylic acids and methacrylic acids and salts and esters thereof, protein, shellac, rubber, polyvinylacetate, polyuronic acid, poly-hydroxy-alcohol, dialkylphthalate, lower alkyl citrate wherein lower alkyl has 1 to 6 carbon atoms, polyglycol, ester of polyhydroxy-alcohol, reocineoleic acid and esters thereof, long chain fatty acids and long chain esters thereof, wherein long chain fatty acid means 6 to 24 C atoms and long chain ester means an $C_{6-24}$ alcohol ester, or phosphoric acid.

Polyalkylene may be for example polyethylene, or polypropylene.

Derivatives of cellulose may be for example cellulose ester such as cellulose acetate, hydroxyprophylmethylcellulose phthalate, hydroxypropylcellulose, hydroxypropylmethylcellulose, sodium carboxymethylcellulose, celluloseacetate-phthalate, cellulose ethers such as lower alkyl cellulose, wherein the lower alkyl group contains from 1 to 3 carbon atoms as for example ethyl cellulose, methylcellulose, other derivatives such as sodium-carboxymethyl-cellulose, or lower hydroxy-alkyl-cellulose wherein the lower alkyl has from 1 to 4 carbon atoms.

Wax may be for example carnauba wax.

Carbohydrates including mono-, di-, and poly saccharides may be for example sucrose, fructose, lactose, maltose, cellobiose, glucose, galactose, mannose, arabinose, sorbitol, starch, agar, or polydextrose.

Starch may be for example potato or corn starch.

Glycoside may be for example steviol.

Gelatin may be for example bovine or pork gelatin.

Monofunctional organic acid may be for example fatty acid, $C_{2-4}$ monocarboxylic acid, or benzoic acid.

$C_{2-4}$ carbonic acid may be for example acetic acid or propanoic acid.

Polyfunctional organic acid may be for example citric acid, glycolic acid, lactic acid, malic acid, tartaric acid, mandelic acid, or fumaric acid.

Protein may be for example gelatin and hydrolyzed gelatin, with derivatives thereof, soy bean protein, or sunflower protein.

Polyuronic acid may be for example alginate and its derivatives.

Poly-hydroxy-alcohol may be for example glycerol, sorbitol, or mannitol.

Dialkylphthalate may be for example dibutylphthalate.

Polyglycol may be for example polyethyleneglycol, methoxy-propylene-glycol, or 1,2-propyleneglycol.

Ester of polyhydroxy-alcohol may be for example mono-, di- and tri-acetate of glycerol.

Preferred embodiments of ADHESAG may be sucrose, fructose, lactose, maltose, cellobiose, glucose, galactose, mannose, arabinose, sorbitol.

In one embodiment FLU comprises only SOLV and no ADHESAG.

In another embodiment, FLU comprises water and ADHESAG, but no alcohol.

In another embodiment, FLU comprises water, ADHESAG and an alcohol, preferably ADHESAG is lactose and SOLV is isopropanol.

The volume of the dispensed droplet can be adjusted with various parameters, such as ID and length of the cannula, temperature of FLU, opening time of the valve and pressure of FLU or a combination thereof.

The volume of the dispensed droplet may be from 0.005 to 2 microliter, preferably from 0.005 to 1.9 microliter, more preferably from 0.005 to 1.8 microliter.

The volume of the droplet may be chosen according to the capsule size, possible ranges are given in Table 3.

TABLE 3

| Capsule Size | Volume of droplet Min [microliter] | Volume of droplet Max [microliter] |
|---|---|---|
| 000 | 0.10 | 1.612 |
| 00 | 0.07 | 1.118 |
| 0 | 0.05 | 0.8 |
| 1 | 0.037 | 0.588 |
| 2 | 0.027 | 0.435 |
| 3 | 0.022 | 0.353 |
| 4 | 0.015 | 0.247 |
| 5 | 0.01 | 0.153 |

For example, a typical range for a droplet in case of capsule size 0 may be from 0.1 to 0.8 microliter.

Some polymers which are used for manufacture the shell of a capsule, such as gelatin, need elevated temperature for gluing or sealing.

Therefore, FLU may be heated or cooled.

Part of the cannula or the whole cannula may be heated or cooled. The open end of the cannula in the pin head may be heated or cooled. By heating or cooling of the cannula or part of the cannula FLU in the cannula is heated or cooled respectively.

Therefore, DEV may comprise means for heating or cooling of FLU.

Therefore, DEV may comprise means for heating or cooling of the pin, the pin head, the mount in the pin, the cannula, parts of the cannula, the opening of the cannula at the end of the cannula in the pin head opening, the fluid dispensing cavity, the valve, or of a combination thereof.

The heating may be effected by conventional means for heating such as electric heating or heated gas, for example

- by electric heating of FLU, the pin, the pin head, the mount in the pin, the cannula, parts of the cannula, the opening of the cannula at the end of the cannula in the pin head opening, the fluid dispensing cavity, the valve, or of a combination thereof, or
- by heating of the pin, the pin head, the mount in the pin, the cannula, parts of the cannula, the opening of the cannula at the end of the cannula in the pin head opening, the fluid dispensing cavity, the valve, or of a combination thereof with heated gas.

The cooling may be effected by conventional heating means such as cooling with cooled gas, for example by cooling of the pin, the pin head, the mount in the pin, the cannula, parts of the cannula, the opening of the cannula at the end of the cannula in the pin head opening, the fluid dispensing cavity, the valve, or of a combination thereof with cooled gas.

In a preferred embodiment, the heating and the cooling is done by gas having the desired temperature.

In a preferred embodiment, the cannula or part of the cannula is heated or cooled, preferably by gas having the desired temperature.

DEV may comprise constructive elements which are used for heating or cooling of FLU.

DEV may comprise constructive elements which are used for heating or cooling of the pin, the pin head, the mount in the pin, the cannula, parts of the cannula, the opening of the cannula at the end of the cannula in the pin head opening, the fluid dispensing cavity, the valve, or of a combination thereof.

The expressions "heating and cooling" and "tempering" in this invention comprise the meanings heating to a desired temperature, cooling to a desired temperature and keeping at a desired temperature.

The gas which may be used for tempering can be any type of gas which is inert towards DEV and preferably also FLU, such as air or nitrogen.

The pin has an available area in its interior; in case of the pin being a round tube then the inner diameter of the pin defines the available area inside of the pin. The cannula has an area which it occupies in the pin, in case of the cannula being a round tube then the outer diameter of the cannula defines the area of the cannula that the cannula occupies in the pin. Preferably, the area of the cannula, and in case that DEV comprises more than one cannula, the added areas of all cannulas in the pin is smaller than the available area inside of the pin. Thereby an empty area and an empty space respectively, called herein empty pin space, is present in the pin besides the cannula. This empty pin space is between the cannula and the pin tube. Gas can pass through this empty pin space and thereby through the pin besides the cannula.

Preferably, the mount in the pin head for fixing the position of the cannula has at least one opening, which is called pin head gas opening herein, connecting the empty pin space besides the cannula in the pin with the pin head opening. The pin head gas opening extends preferably in the longitudinal direction. The pin head gas opening may be a bore or hole in the mount in the pin head, preferably extending in the longitudinal direction. Thereby gas can pass through the pin; for example, the gas may enter the pin through the opening in the pin foot, passes through the empty pin space besides the cannula in the pin, passes through the pin head gas opening and then leaves the pin via the pin head opening.

If there is more than one cannula in the pin, then preferably all pin head openings for the cannulas are in fluid connection with each other and at least one pin head gas opening is comprised in the mount in the pin head bringing all pin head openings into fluid connection with the empty space besides the cannula in the pin. In case when 1, 2, 3 or 4 cannulas are comprised in the pin, then preferably for each cannula one pin head gas opening is comprised in the mount in the pin head.

Thereby the pin, the pin head, the mount in the pin, the cannula, parts of the cannula and the opening of the cannula at the end of the cannula in the pin head opening may be heated or cooled by gas having a respective temperature passing through the pin. Thereby the FLU in the cannula can be heated or cooled and can thereby be dispensed by DEV in form of a droplet having a desired temperature.

- The temperature of FLU may be from 10° C. to the boiling point of FLU, preferably from 15° C. to the boiling point of FLU.
- The temperature may be chosen with respect of the polymer that forms the wall of the cap or of the body.
- For example for a cap or a body made from HPMC or pullulan, the temperature of FLU may be from 10 to 35° C., preferably from 15 to 30° C.
- For a cap or a body made from gelatin, the temperature of FLU may be from 50 to the boiling point of FLU ° C.
- FLU may comprise water but no alcohol, in this case the upper temperature of FLU may be 100° C., preferably 90° C., more preferably 80° C., even more preferably 75° C.
- FLU may comprise water and an alcohol such as EtOH, in this case the upper temperature of FLU may be 75° C., preferably 70° C.
- For example, for a cap or a body made from gelatin and FLU comprising water but no alcohol, the temperature of FLU may be from 50 to 95° C., preferably from 50 to 90° C.

The temperature of the heating means are chosen and set to a respective value that effects the heating or cooling of FLU to and the keeping of FLU at the desired temperature.

Further subject of the invention is an apparatus APP used in the closing process of caps and bodies to form closed capsules or used in the insertion of a tablet or a caplet into a cap or into a body; wherein APP comprises DEV for dispensing droplets of FLU onto the inside surface of a cap or onto the inner surface of a body of a capsule; wherein with DEV and FLU as defined herein, also with all their embodiments.

Furthermore APP may comprise a device for supplying FLU into the valve cavity. APP may comprise a device for keeping FLU in the valve cavity under a predefined pressure.

APP may comprise means for heating or cooling of FLU.

APP may comprise means for heating or cooling of the pin, the pin head, the mount in the pin, the cannula, parts of the cannula, the opening of the cannula at the end of the cannula in the pin head opening, the fluid dispensing cavity, the valve, or of a combination thereof.

The heating may be effected by conventional means for heating such as electric heating, heated gas, infrared heating, induction heating, microwave heating;

for example by electric heating of FLU, the pin, the pin head, the mount in the pin, the cannula, parts of the cannula, the opening of the cannula at the end of the cannula in the pin head opening, the fluid dispensing cavity, the valve, or of a combination thereof, or by heating of the pin, the pin head, the mount in the pin, the cannula, parts of the cannula, the opening of the cannula at the end of the cannula in the pin head opening, the fluid dispensing cavity, the valve, or of a combination thereof with heated gas.

The cooling may be effected by conventional heating means such as cooling with cooled gas of cooled liquid, for example by cooling of the pin, the pin head, the mount in the pin, the cannula, parts of the cannula, the opening of the cannula at the end of the cannula in the pin head opening, the fluid dispensing cavity, the valve, or of a combination thereof with cooled gas.

In a preferred embodiment, the heating and the cooling is done by gas having the desired temperature.

In a preferred embodiment, the cannula or part of the cannula is heated or cooled, preferably by gas having the desired temperature.

APP may comprise constructive elements which are used for heating or cooling of FLU.

APP may comprise constructive elements which are used for heating or cooling of the pin, the pin head, the mount in the pin, the cannula, parts of the cannula, the opening of the cannula at the end of the cannula in the pin head opening, the fluid dispensing cavity, the valve, or of a combination thereof.

Therefore APP may comprise a device for heating or cooling gas, called gas tempering device. APP may comprise a device for supplying gas. The supply of the gas and the tempering of the gas may be done by the same device of APP, a device for supplying tempered gas.

In one embodiment, APP comprises a gas inlet channel and a gas inlet splitter The gas inlet channel is fed with gas having the desired temperature. Preferably, a device for supplying tempered gas comprised in APP feeds the gas with the desired temperature into the gas inlet channel.

The gas inlet splitter may be fed with the gas from the gas inlet channel.

The gas inlet splitter may have two positions SPLITTERTEMPER and SPLITTERBYPASS, in the position SPLITTERTEMPER the gas inlet splitter feeds the pin with the gas, in the position SPLITTERBYPASS the pin is bypassed by the gas.

APP may additionally have a gas bypass outlet channel. In SPLITTERBYPASS the gas may be fed by the gas inlet splitter into the gas bypass outlet channel.

APP may comprise a gas tempering outlet channel into which the gas is fed which leaves the pin.

The gas flow from the gas tempering channel and the gas flow from the gas bypass channel may be fed into a gas combining outlet channel.

Gas from the gas tempering channel, from the gas bypass channel or from a gas combining outlet channel may be fed back into the device for supplying tempered gas.

APP may have means for feeding the gas with a pressure into the gas inlet channel.

APP may have means for applying a vacuum to any gas bypass outlet channel, to any gas temper outlet channel, to any gas combining outlet channel or to any combination thereof. Thereby the gas and any vapor of FLU may by sucked off and away, for example when the gas exits from the pin head.

Feeding the gas with pressure or applying a vacuum for sucking away the gas or both may facilitate the circulation of the gas, it may also facilitate a purging or cleaning of APP before or after a closing operation, such as before or after a processing campaign of closing capsules. The gas inlet splitter may comprise a spring, called spring of the gas inlet splitter, which keeps the gas inlet splitter in one of the two positions, preferably the gas inlet splitter is held by the spring of the gas inlet splitter in SPLITTERBYPASS. The gas inlet splitter may be actuated mechanically or by an electromagnetic field to attain the other position.

Mechanical actuation of the gas inlet splitter may be effected by the pin socket, for example by a foot of the pin socket. The foot of the pin socket may have an opening, called opening in the foot of the pin socket, which is fluid connection through the pin socket, for example by a respective bore in the pin socket, with the pin foot and the opening in the pin foot mounted in the pin socket.

The cap or the body which will receive the dispensed droplet onto their inner surface may be held in APP in a holder; preferably more than one holder are arranges and mounted in a ring of holders of APP.

Therefore APP may comprise a holder for holding the cap or the body.

APP may comprise more then one holder arranged and mounted in a ring of holders.

A common way to hold the cap in an holder in APP is with the opening of the cap facing downward and the body is held in a respective holder with the opening of the body facing upward. This has the advantage that the body may also be filled during operation without the need of turning the body or the cap upside down during operation.

But obviously either the cap or the body may be held in any direction with their respective opening facing in any respective direction for the purpose of dispensing a droplet onto the inner surface of their wall. The following description of the mode of action of DEV and of the pin with respect to the any moving direction of DEV and of the pin is concerned with this common way to hold the cap in a holder in APP, that is with the opening of the cap facing downward.

and it concerned with dispensing a droplet onto the inner surface of the wall of a cap, but obviously instead of a cap also a body may be held in the holder and the dispensing is done onto the respective inner surface of the body held in the holder;

and in general construction of APP and thereby the movement of the pin can be adapted to allow for any moving direction of the pin matching any direction with which the cap or the body is held in a holder in APP and matching any direction into which the opening of a cap or a body is facing.

Essentially the movement of the pin is in alignment with the longitudinal direction of the cap or the body respectively, and by the movement of the pin the pin enters the cavity of the cap or of the body respectively through their opening.

Obviously APP may also be constructed in such a way that the PIN is static and the cap or the body moves; or even both the PIN and the cap or the body may move.

Mechanical actuation of the gas inlet splitter by the foot of the pin socket may be realized by a alternation of the pin between two positions, a position PINDISPENSE and a position PINTEMPER. The pin may alternate vertically between the two positions, this vertical movement is preferably aligned with the longitudinal direction as defined herein.

So the mentioned common way to hold the cap in APP with its opening facing downward. PINDISPENSE may be in an upper vertical position and PINTEMPER may be in a lower vertical position with respect to each other. Since the pin is mounted in the pin socket, and more than one pin and there pin sockets may be mounted in an array of pins, the pin, the pin socket and any array of pins may alternate between these two positions.

Preferably the cap does not change its vertical position during the operation of APP for dispensing a droplet. Preferably the holder is located in vertical direction above the pin head. In PINDISPENSE the pin head is located in the cavity of the cap and dispenses the droplet onto the inner surface of the cap; in PINTEMPER the pin head is outside and below the cavity of the cap. In PINDISPENSE the gas inlet splitter may be in SPLITTERBYPASS; in PINTEMPER the gas inlet splitter may be in SPLITTERTEMPER.

In PINDISPENSE the spring of the gas inlet splitter may hold the gas inlet splitter in SPLITTERBYPASS. In PINDISPENSE the foot of the pin socket is preferably disconnected, preferably in the vertical direction, from the gas inlet splitter, so the foot of the pin socket in PINDISPENSE preferably does not abut the gas inlet splitter.

When the pin alternates from PINDISPENSE to PINTEMPER, the foot of the pin socket moves down. At a certain point of the downward movement the foot of the pin socket abuts the gas inlet splitter and when the downward movement continues the foot of the pin socket then pushes the gas inlet splitter down against the action of the spring of the gas inlet splitter. In PINTEMPER the foot of the pin socket abuts the gas inlet splitter and has pushed the gas inlet splitter into SPLITTERTEMPER; the gas inlet splitter feeds the gas into the opening in the foot of the pin socket, from there the gas flows through the pin socket into the opening in the pin foot, then through the pin and leaves the pin from the pin head.

In this way the cannula is tempered in PINTEMPER, and in PINDISPENSE the gas bypasses the cannula. So the position PINDISPENSE can also be called PINBYPASS in view of the gas flow.

The holder may receive the cap in two positions, in a position CORRECTPOS and in a position UPSIDEDOWNPOS. In CORRECTPOS the opening of the cap is downward and the closed end of the cap is upward in vertical direction, in UPSIDEDOWNPOS it is vice versa. For dispensing droplets by the pin head in the cavity of the cap, obviously the cap needs to be in CORRECTPOS. The pin head will eject any cap which is in UPSIDEDOWNPOS, when the pin head moves from PINTEMPER to PINDISPENSE. Usually before the cap is placed in the holder the cap is provided together with the body in form of a capsule, that means in form of a closed or pre-closed, that is non-opened capsule, and the body needs to be removed from the cap. It happens that the cap and the body do not separate properly and the capsule, that is a cap engaged with a body, is inserted into the holder instead of the cap only. In this case the closed end of the body faces downward toward the pin head; and when the pin head moves upward the pin will eject such non-opened capsule as well. This is another advantage of the invention: thereby the control of the filling of the holder with the cap in the correct position, and a control that actually a cap only and not a capsule, that is a cap with a body in closed or pre-closed, that is non-opened state, is filled into the holder, is effected by the same pin head that will be used for dispensing the droplet and simultaneously in the same process step of dispensing droplets. APP may comprise means for filling the body. APP may comprise further means for closing the capsule. For the means for closing the capsule after filling the body by telescopically engaging the cap with the body, it is also necessary that the cap is in CORRECTPOS: the filled body needs to be in a position with its open end pointing upwards, otherwise the filling would spill out, so obviously for closing the capsule the cap needs to be in CORRECTPOS. So in case it is desired to dispense a droplet onto the surface of a cap, for example for making a capsule more tamperproof, the ejecting of caps in UPSIDEDOWNPOS or of closed or pre-closed, that is non-opened capsules, that is a cap and a body that have not been properly separated, by the pin head that also dispenses the droplet the cap is not only in the correct position for dispensing droplets but also for the later closing of the capsule.

The gas flow in PINTEMPER and SPLITTERTEMPER may be as follows:

The gas inlet channel, the gas inlet splitter, the opening in the foot of the pin socket, the opening in the pin foot, the empty pin space, the pin head gas openings, the pin head opening and the gas tempering outlet channel are in fluid connection, gas with the desired temperature can pass through and the FLU in tempered to the desired temperature.

The gas flow in PINDISPENSE and SPLITTERBYPASS may be as follows:

The gas inlet channel, the gas inlet splitter and the gas bypass outlet channel are in fluid connection, gas with the desired temperature can pass through. Thereby the gas does not pass through the pin and the dispensing of the droplet is not disturbed by flowing gas. Furthermore a drying of the dispensed droplet by the gas is prevented. This is important since the dispensed droplet is desired to remain as much intact as possible until for example the closure of the capsule by sliding the cap over the body, or the sliding of the body into the cap, whereby the droplet is spread in the overlapping region, the region of the inner surface of the walls of the cap and the body which overlap when the capsule is closed and the cap telescopically engages with the body; or until for example a caplet or a tablet is inserted into the cavity of the cap or of the body and comes into contact with the droplet.

Another subject of the invention is a method for dispensing a droplet of a fluid FLU onto the inner surface of a cap or onto the inner surface of a body of a capsule, wherein the droplet is dispensed by DEV;

the method comprises providing the valve, the outlet channel of the valve, the fluid dispensing cavity and the cannula of DEV filled with FLU, with the valve closed and having FLU in the valve under pressure;

and the method comprises the steps 1 to 3:

step 1: inserting the pin head into the cavity of the cap or the body;

step 2: opening and closing the valve for a predefined period of time to dispense a droplet onto the inner surface of cap or the body;

step 3: extracting the pin head from the cavity of the cap or the body;

with FLU and DEV as defined herein, also with all their embodiments.

The method may comprise a step 4, which is done after step 3, in step 4 the cap and the body are telescopically engaged with each other. The method when comprising said step 4 provides a capsule; the provided capsule is a closed capsule.

Further subject of the invention is a capsule obtainable by the method as described herein, also with all embodiments of the method and of the capsule as described herein, the method comprises step 4; the manufactured capsule is a closed capsule.

Preferably, the method is carried out with APP;

with APP as defined herein, also with all its embodiments.

When APP comprises more then one holder arranged and mounted in a ring of holders, then steps 1 to 3 may be done consecutively with the ring of holders moving the holder holding the cap or the body onto which a droplet has been dispensed away from the vertical position over the pin head and the next holder in the ring of holders is thereby moved into this vertical position over the pin head and the next succession of steps 1 to 3 may be carried out, this may be repeated until all caps or bodies in the holders in the ring of holders have received their respective droplet.

DEV, APP and the method as defined herein allow for:

dispensing a single droplet of an adhesive, this is effected by choosing the respective valve, a respective opening time of the valve and a respective pressure of FLU in the valve cavity;

dispensing the droplet onto the inner surface of the wall of the cap or onto the inner surface of the wall of the body, for example onto the inner surface of the wall of the cap in the region of overlap of the cap with the body once closed, this is effected by inserting the pinhead into the cavity of the cap or the body for dispensing the droplet;

dispensing the droplet in a controlled way with respect to the direction of the dispensing and with respect to the size of the droplet, this is effected by choosing the desired bending angle of the cannula so that the droplet that is dispensed from the opening of the cannula leaves the cannula in the desired direction;

dispensing the droplet with a temperature different from ambient temperature, such as a temperature higher or lower than ambient temperature, this is effected by tempering FLU and the respective parts of DEV and APP as described herein;

manufacture of capsules with a telescopically engaged cap and body, which has an increased pull-apart force of the cap from the body compared to a similar capsule but manufactured without dispensing of a droplet of an adhesive, this is effected when the dispensed droplet is spread in the overlapping region, that is in the region of contact of the inner surfaces of the walls of the cap and the body which overlap when the capsule is closed and the cap telescopically engages with the body;

manufacture of a capsule containing a caplet or a tablet, wherein the caplet or the tablet is at least partially enclosed by the cap or the body or both and wherein the cap or the body or both are glued to the enclosed caplet or tablet by a droplet of an adhesive dispensed onto the inner surface of the wall of the cap or onto the inner surface of the wall of the body respectively, thereby effecting an increased pull-apart force of the cap or of the body respectively from the enclosed caplet or tablet compared to a similar capsule manufactured without said dispensing of a droplet of an adhesive, this is effected when a caplet or a tablet is inserted into the cavity of the cap or the body containing the droplet dispensed on the inner surface of their walls and the caplet and tablet comes into contact with the dispensed droplet which is thereby spread between the inner surface of the wall of the cap or the body and the surface of the caplet or tablet.

BRIEF DESCRIPTION OF THE DRAWINGS

The present invention will be described again with reference to the enclosed drawings, wherein.

DETAILED DESCRIPTION OF PREFERRED EMBODIMENTS

Figure 1:
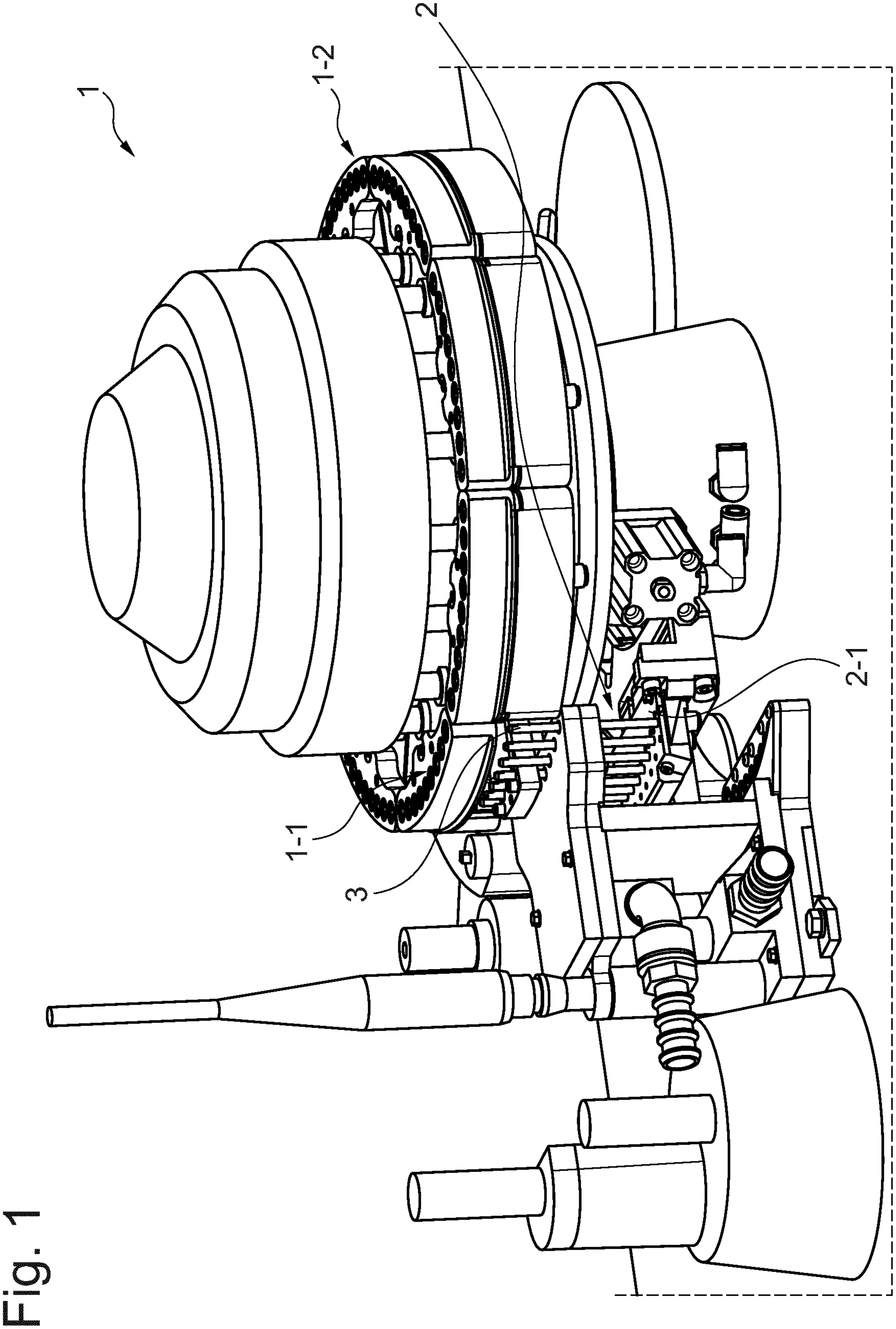
FIG. 1: shows a perspective view of APP.

The present invention will now be described in more detail with reference to the enclosed figures. Same components and arrangements are denoted in the figures by the same reference numerals and the respective description may be omitted in order to avoid redundancies. Obviously what is depicted as a cap of a capsule in the figures may as well be a body of a capsule.

FIG. 1 shows an embodiment of an apparatus APP 1 which is used in the process of filling a capsule. APP 1 comprises an array 2 of pins 3, eight pins 3 in the array 2 are shown, they are mounted in the array 2 of pins 6 by a mounting plate 2-1 of the array 2 of pins 3. The pins 3 are located below a ring 1-2 of holders 1-1 for holding caps 6 or bodies of capsules, the caps 6 are not shown in this figure. A holder 1-1 is essentially a vertical hole in the ring 1-2 The pins 3 are vertically aligned with the holders 1-1 in the ring 1-2.

Figure 2:
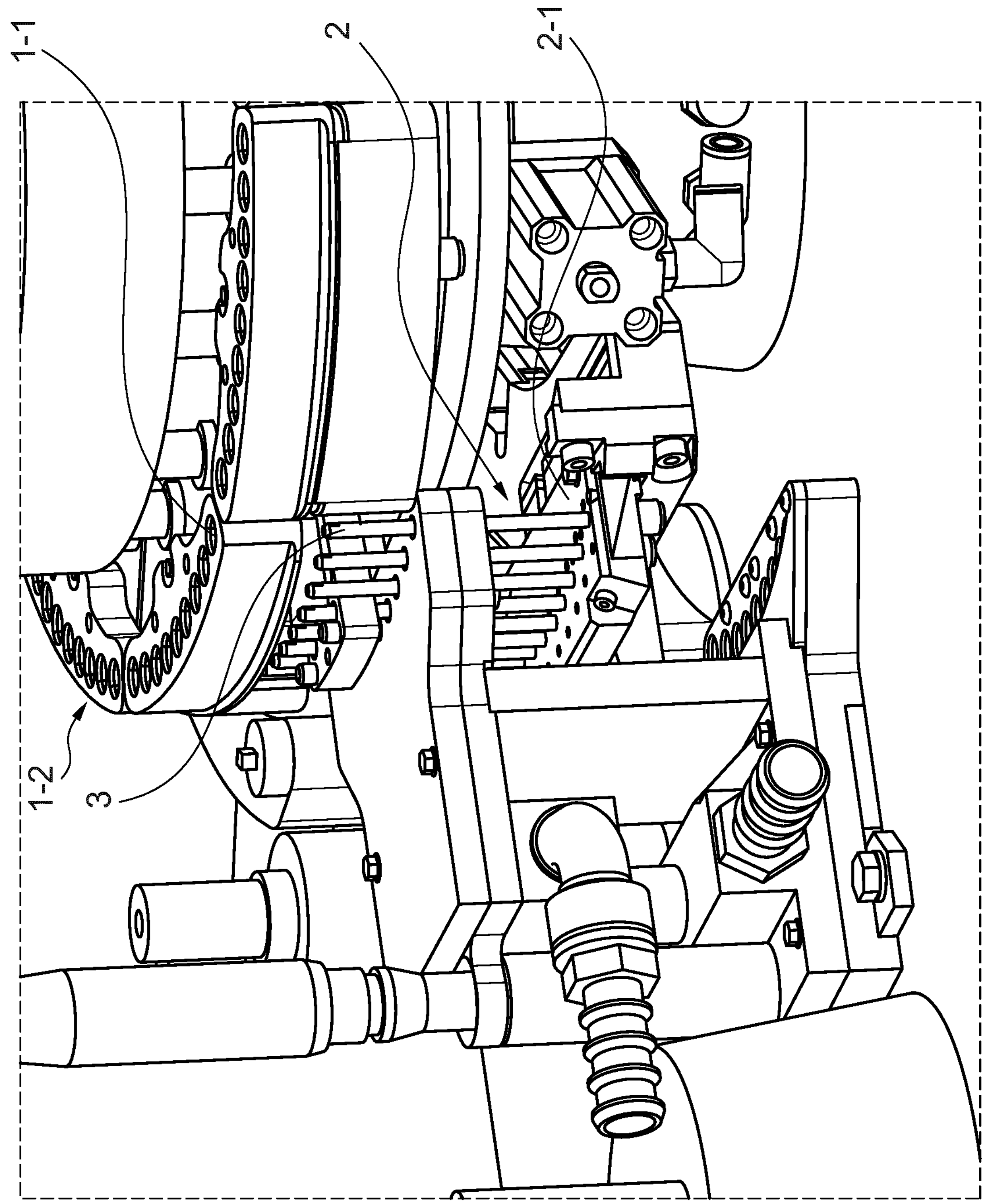
FIG. 2: shows a enlarged perspective view of a section of APP where an array of pins is located in APP.

FIG. 2 shows an enlarged section of APP from FIG. 1. Shown is the array 2 of pins 3, eight pins 3 in the array 2 are shown. The pins 3 are located below the ring 1-2 of holders 1-1 for holding caps 6 of capsules. A holder 1-1 is essentially a vertical hole in the ring 1-2 The pins 3 are vertically aligned with the holders 1-1 in the ring 1-2.

Figure 3:
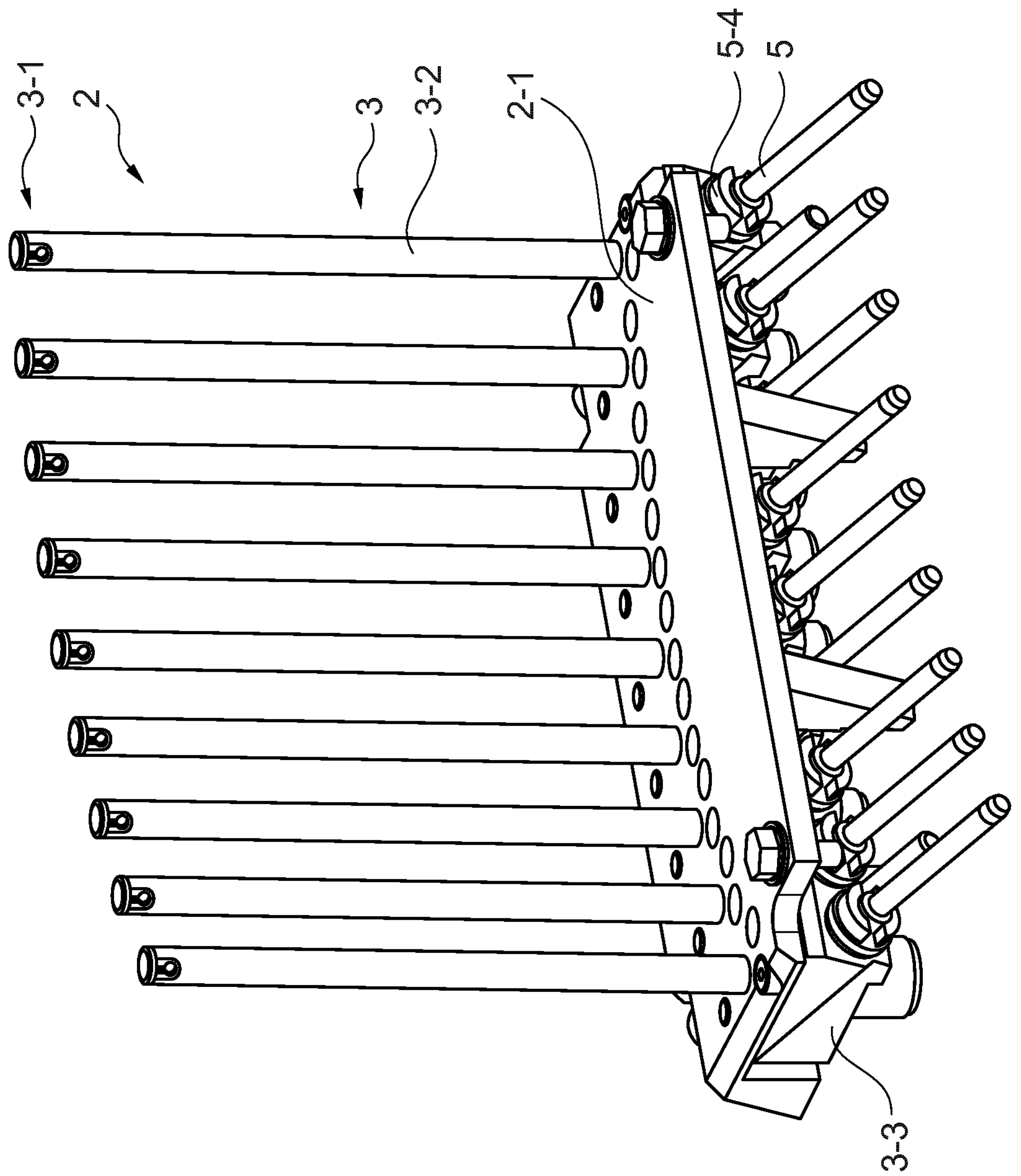
FIG. 3: shows a perspective view of an array of pins containing 9 pins, the perspective view is from top front left.

FIG. 3 shows from above the array 2 of pins 3 with nine pins 3. The pins are mounted in the array 2 of pins 3 by a mounting plate 2-1 of the array 2 of pins 3. Each pin 3 comprises inter alia a pin head 3-1 and a pin tube 3-2. The end of the pin opposite to the pin head, that is the pin foot, which is not shown, is mounted in a pin socket 3-3. Also shown is the valve 5 and the valve mount 5-4 for mounting the valve 5 to the pin socket 3-3.

Figure 4:
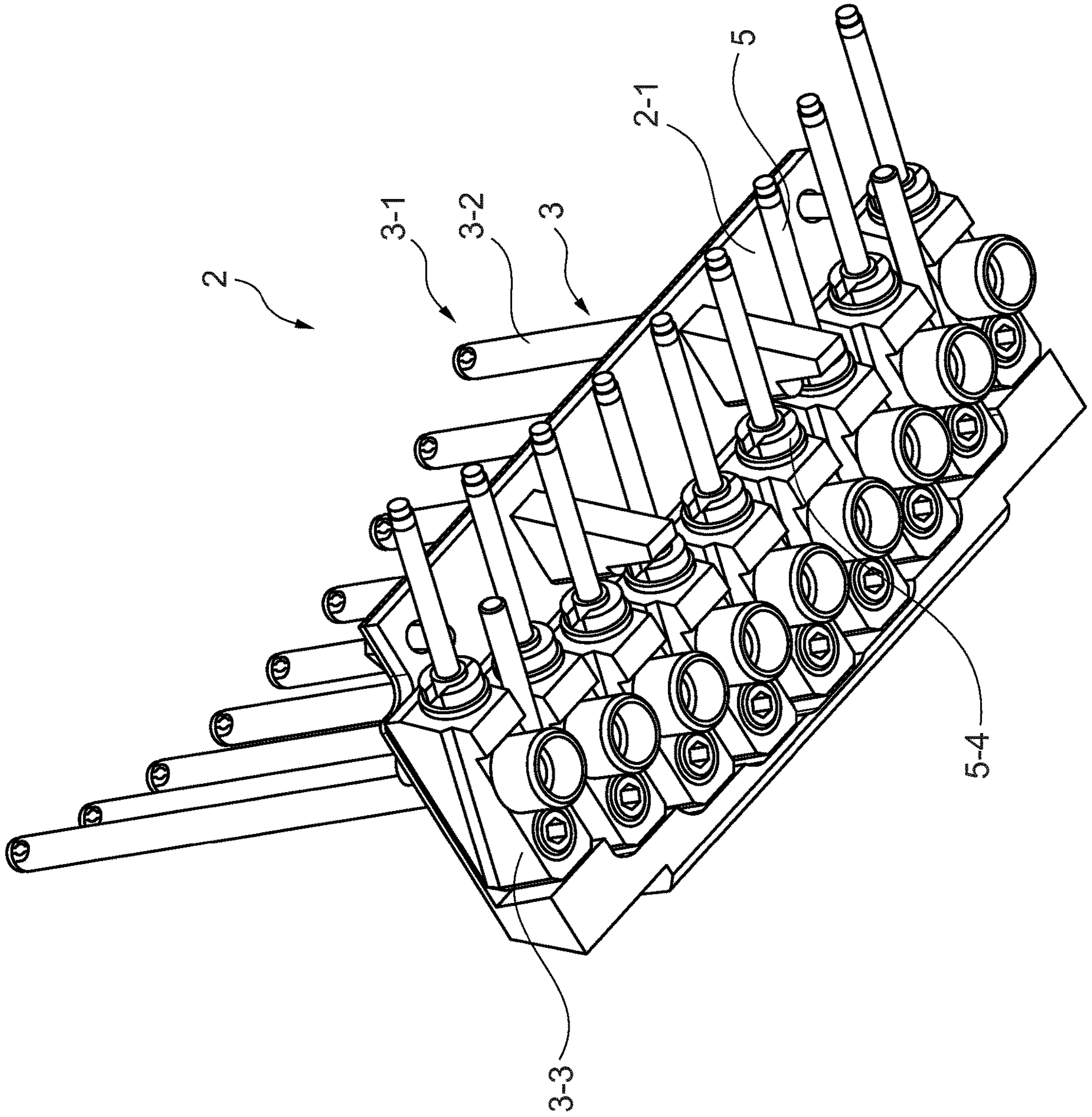
FIG. 4: shows a perspective view of an array of pins containing 9 pins, the perspective view is from bottom front left.

FIG. 4 shows from below the array 2 of pins 3 with nine pins 3. The pins are mounted in the array 2 of pins 3 by a mounting plate 2-1 of the array 2 of pins 3. Each pin 3 comprises inter alia a pin head 3-1 and a pin tube 3-2. The end of the pin opposite to the pin head, that is the pin foot, which is not shown, is mounted in a pin socket 3-3. Also shown is the valve 5 and the valve mount 5-4 for mounting the valve 5 to the pin socket 3-3.

Figure 5:
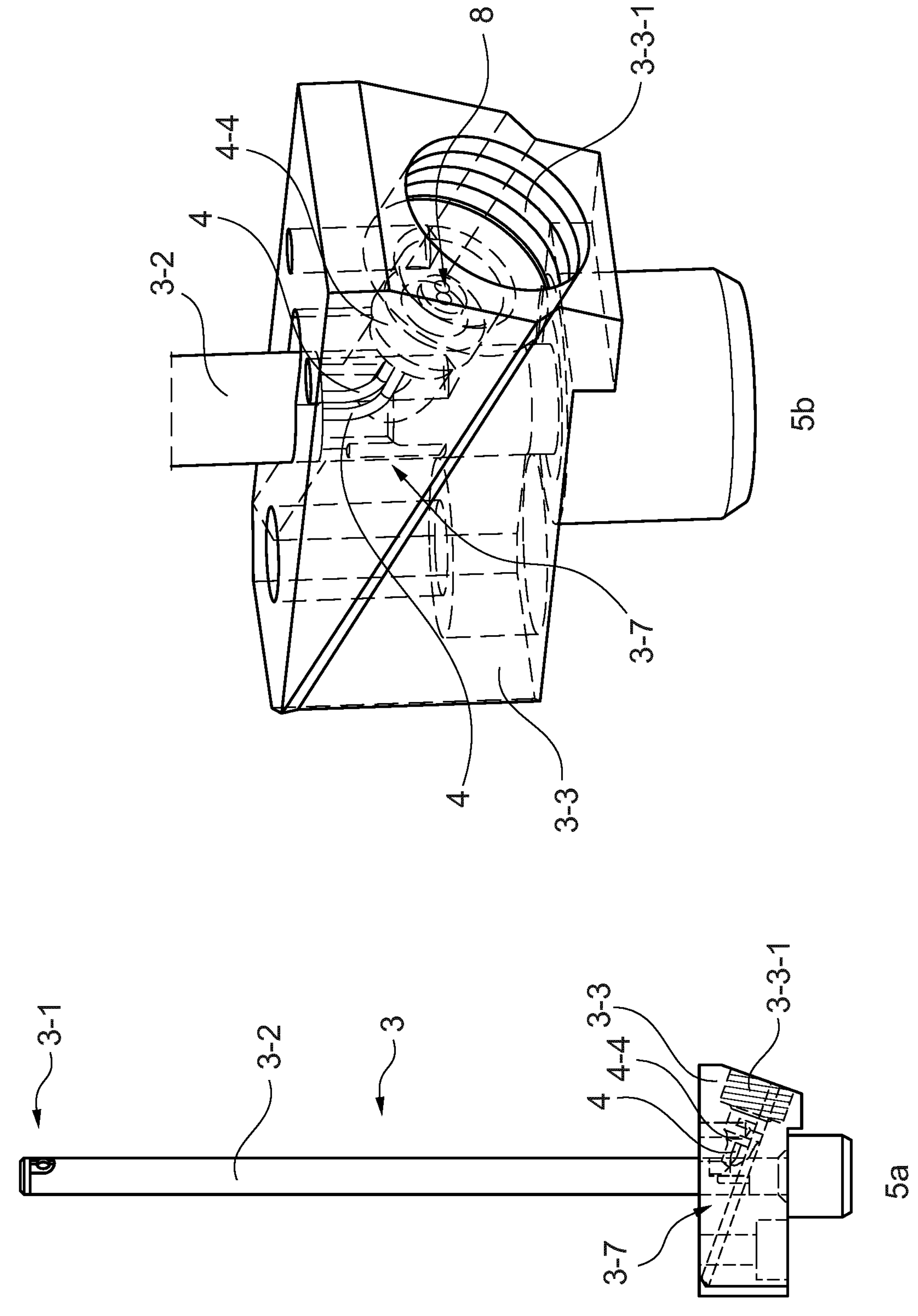
FIG. 5: shows a schematic side view 5*a* of a pin together with the pin socket and an enlarged perspective view 5*b* of the pin socket.

FIG. 5 comprises two views, the view 5 *a* and the view 5*b*. The view 5*a* shows the pin 3 with its pin head 3-1, its pin tube 3-2, and the pin socket 3-3 into which the pin foot 3-7 is mounted. Also shown is the inner thread 3-3-1 in the pin socket 3-3 with which the valve 5, which is not shown, is mounted by the valve mount 5-4, which is not shown, to the pin socket 3-3 by a screw type connection. Also shown is a cannula 4 which extends in a bended way from the cannula mount 4-4, which mounts the cannula to the pin socket 3-3, into the pin tube 3-2.

The view 5*b* shows an enlarged section of the view 5*a* from a slightly different perspective, shown are the pin tube 3-2 and the pin socket 3-3 into which the pin foot 3-7 is mounted. Also shown is the inner thread 3-3-1 in the pin socket 3-3 with which the valve 5, which is not shown, is mounted by the valve mount 5-4, which is not shown, to the pin socket 3-3 by a screw type connection. Also shown are two cannulas 4 and the fluid dispensing cavity 8; the cannulas 4 extend from the fluid dispensing cavity 8 in a bended way into the pin tube 3-2. The cannulas 4 are mounted to the pin socket 3-3 by the cannula mount 4-4; the cannula mount comprises the fluid dispensing cavity 8.

Figure 6:
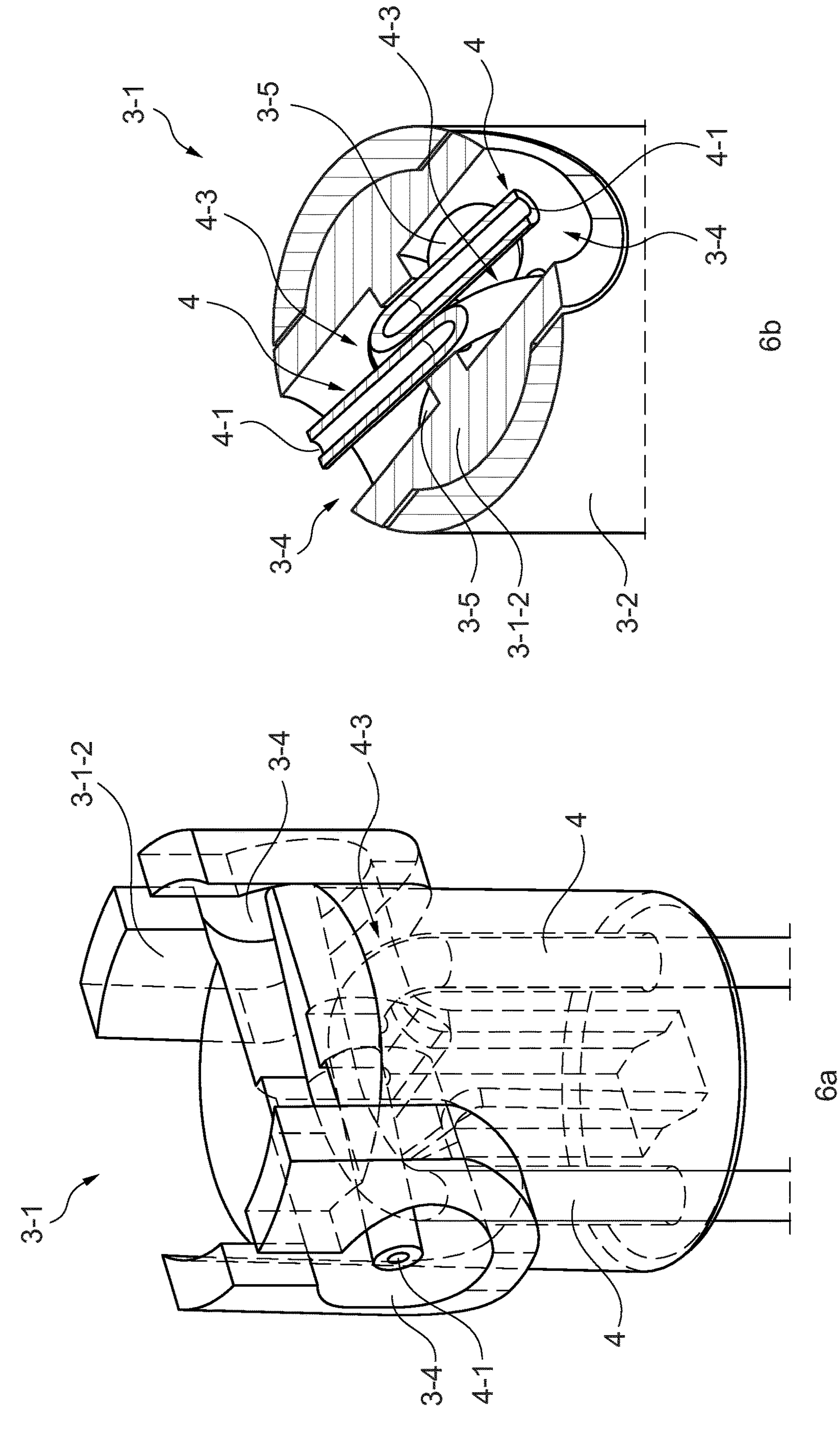
FIG. 6: shows two views, a view 6*a* and a view 6*b*, the view 6*a* shows a perspective view of a part of the pin head with two cannulas and the mount in the pin head for fixing the position of the cannulas, the view 6*b* shows a cross section of the pin head perpendicular to the longitudinal axis with two cannulas each with a 900 bend and with the opening of the cannula facing in opposite directions with respect to each other, the cross sections cuts though the end of the cannulas showing the tube like nature of the cannula, also shown is the mount in the pin head for fixing the position of the cannulas and pin head opening comprising an open space separating the opening of the cannula circumferentially from the wall of the pin head.

FIG. 6 shows two views, a view 6*a* and a view 6*b*, the view 6*a* shows a perspective view of a part of the pin head 3-1 with two cannulas 4 and the mount 3-1-2 in the pin head for fixing the position of the cannulas, also shown is the pin head opening 3-4 comprising an open space separating the end of the cannula 4 with its opening 4-1 circumferentially from the wall of the pin head 3-1.

The view 6*b* shows a cross section of the pin head 3-1 perpendicular to the longitudinal axis of the pin 3, shown by the pin tube 3-2, with two cannulas 4 each with a 900 bend 4-3 and with the opening 4-1 of the cannula facing in opposite directions with respect to each other, the cross section cuts though the end of the cannulas 4 showing the tube like nature of the cannula, also shown is the mount 3-1-2 in the pin head 3-1 for fixing the position of the cannulas 4 and pin head opening 3-4 comprising an open space separating the end of the cannula with its opening 4-1 circumferentially from the wall of the pin head 3-1. Also shown are two pin head gas openings 3-5 which connect the empty pin space 3-6, which is not shown, besides the cannula 4 in the pin 3 with the pin head opening 3-4.

Figure 7:
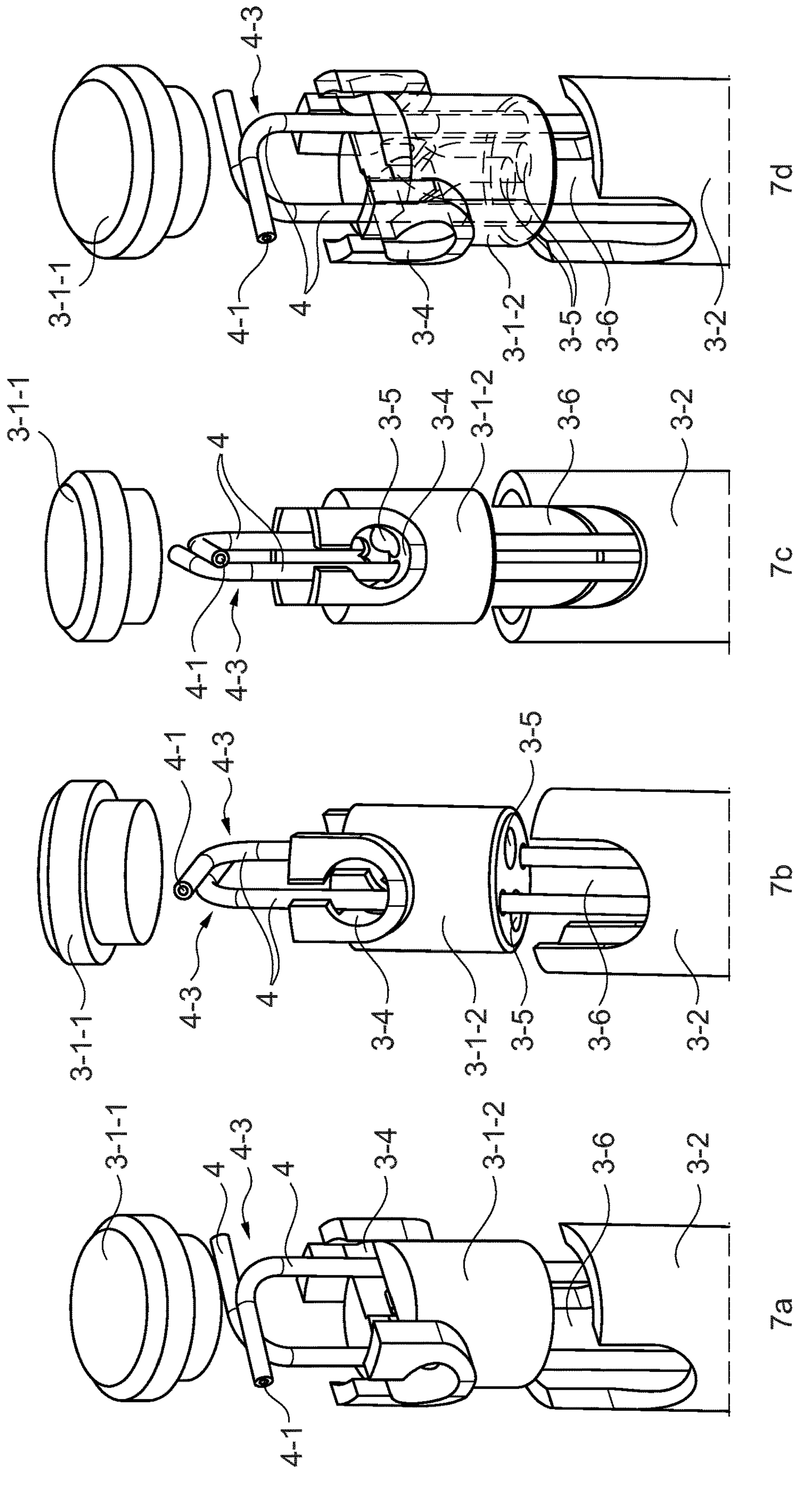
FIG. 7: shows four perspective and exploded views 7*a*, 7*b*, 7*c* and 7*d* of the pin head.

FIG. 7 four perspective and exploded views 7*a*, 7*b*, 7*c* and 7*d* of the pin head 3-1. Shown are the pin head closure cap 3-1-1, two cannulas 4, openings 4-1 of the cannulas 4, the bend 4-3 of the cannulas 4 in the pin head 3-1, the pin head opening 3-4 comprising an open space separating the end of the cannula with its opening 4-1 circumferentially from the wall of the pin head 3-1, mount 3-1-2 in the pin head 3-1 for fixing the position of the cannula 4, pin head gas openings 3-5 which connect the empty pin space 3-6 besides the cannula 4 in the pin 3 with the pin head opening 3-4.

Figure 8:
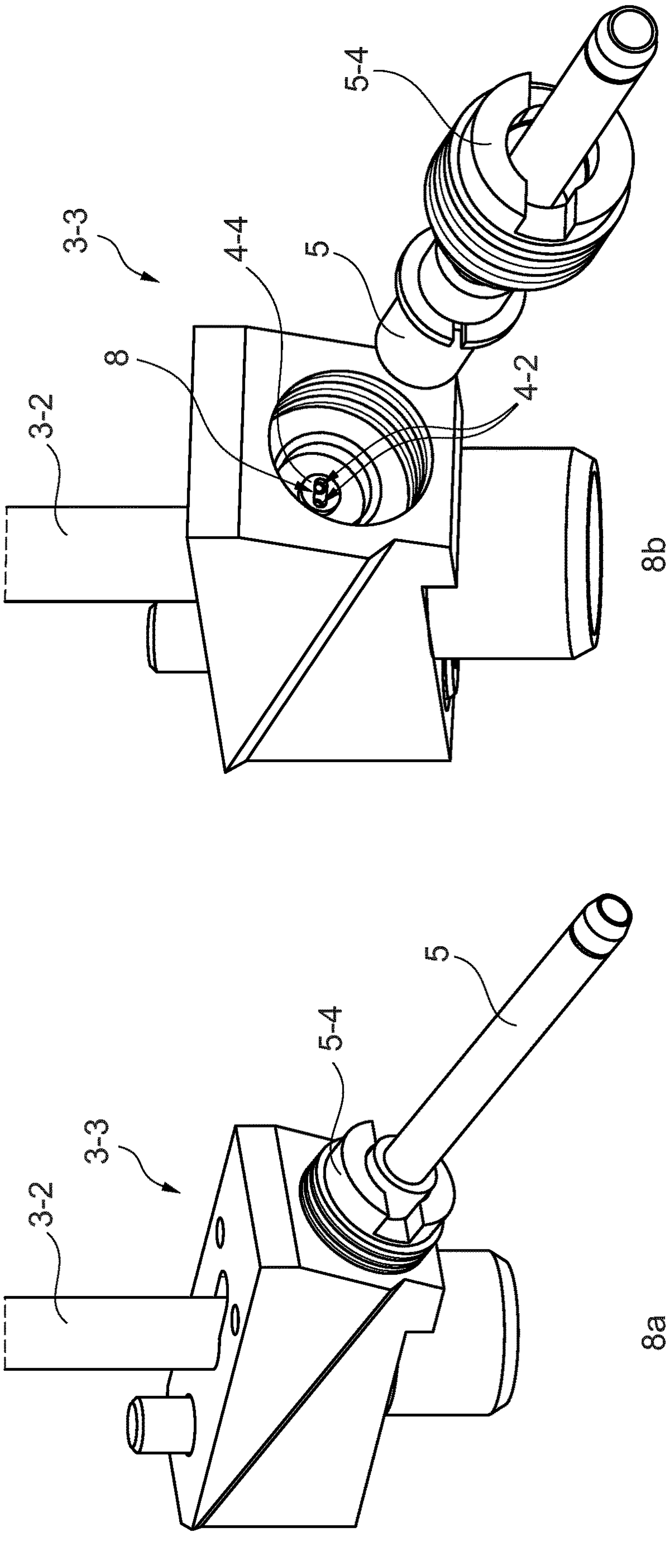
FIG. 8: shows two perspective views 8*a* and 8*b* of the pin socket, view 8*b* is an exploded view with the valve and the screw type mount detached from the pin socket, thereby revealing the fluid dispensing cavity.

FIG. 8 shows two perspective views 8*a* and 8*b* of the pin socket 3-3, view 8*a* shows the pin tube 3-2 mounted in the pin socket 3-3, the valve 5 mounted by the valve mount 5-4 in the pin socket 3-3. View 8*b* is an exploded view with the valve 5 and the screw type valve mount 5-4 detached from the pin socket 3-3, thereby revealing the cannula mount 4-4 comprising the fluid dispensing cavity 8 and mounting two cannulas with their openings 4-2 to the fluid dispensing cavity 8.

Figure 9:
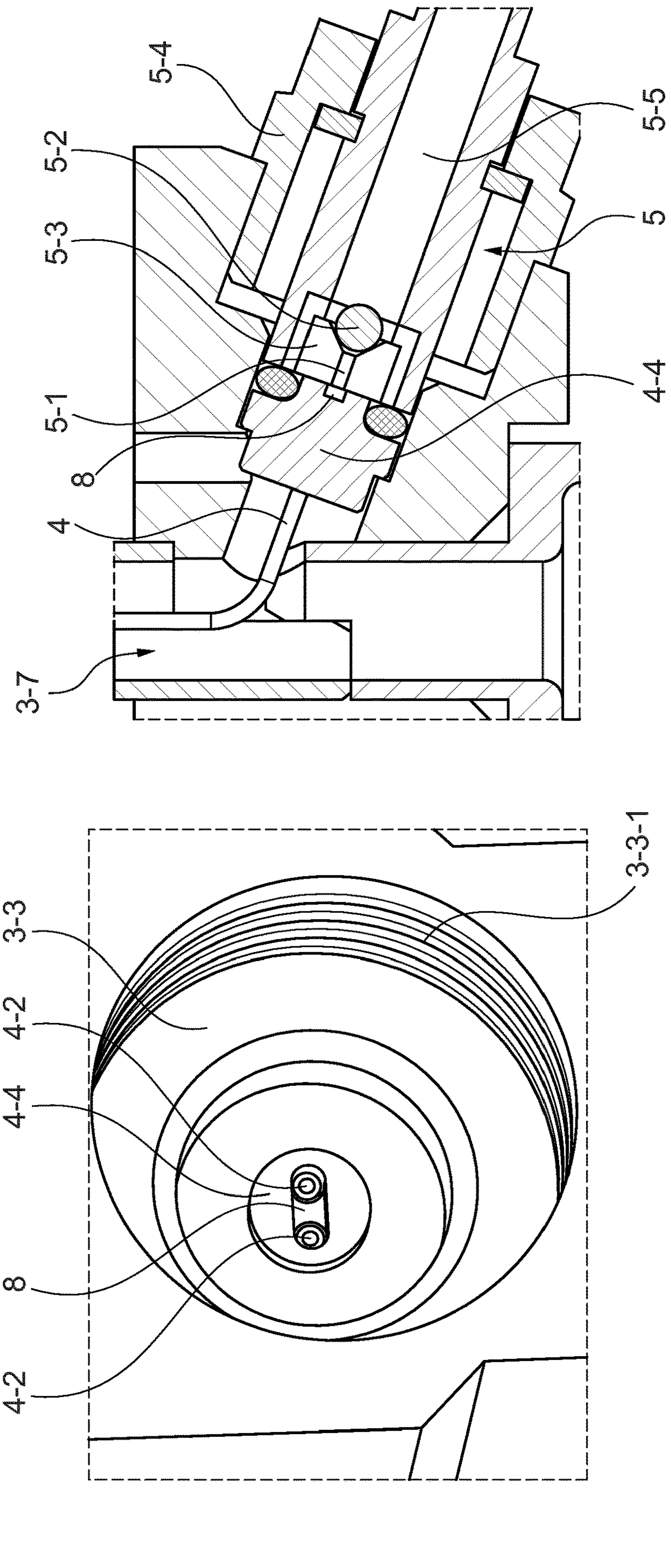
FIG. 9: shows two views 9*a* and 9*b* of an enlarged section of the pin socket, view 9*a* shows a perspective view of the fluid dispensing cavity with two cannulas leaving from the fluid dispensing cavity; view 9*b* shows a sectional side view with details of the pin socket such as cannula, fluid dispensing cavity, valve and outlet channel of the valve.

FIG. 9 shows two views 9*a* and 9*b* of an enlarged section of the pin socket, view 9*a* shows a perspective view of the cannula mount 4-4 mounted to the pin socket 3-3, the cannula mount 4-4 comprises the fluid dispensing cavity 8 and mounts two cannulas 4 with their openings 4-2 to the fluid dispensing cavity 8, also shown is the inner thread 3-3-1 in the pin socket 3-3 with which the valve 5, which is not shown, is mounted by the valve mount 5-4, which is not shown, to the pin socket 3-3 by a screw type connection. View 9*b* shows a sectional side view with details of the pin socket 3-3 such as the pin foot 3-7 mounted to the pin socket 3-1, a cannula 4, the cannula mount 4-4 comprising the fluid dispensing cavity 8, the valve 5 with the outlet channel 5-1 of the valve and the valve seat 5-3 and the valve ball 5-2. The valve 5 is mounted to the pin socket 3-3 by the valve mount 5-4, not shown are the means for actuating the valve ball 5-2, such as a mobile anchor for pressing the valve ball 5-2 against the valve seat 5-3 by action of a closing spring on the mobile anchor, or a valve coil which pulls the mobile anchor magnetically, when a current is fed through the valve coil, by a magnetic field of a stationary anchor, away from the valve seat 5-3, which effects the opening of the valve 5, so that FLU can enter the outlet channel 5-1 of the valve 5 and, after passing through the outlet channel 5-1, emerges from the outlet channel 5-1 into the fluid dispensing cavity 8.

Figure 10:
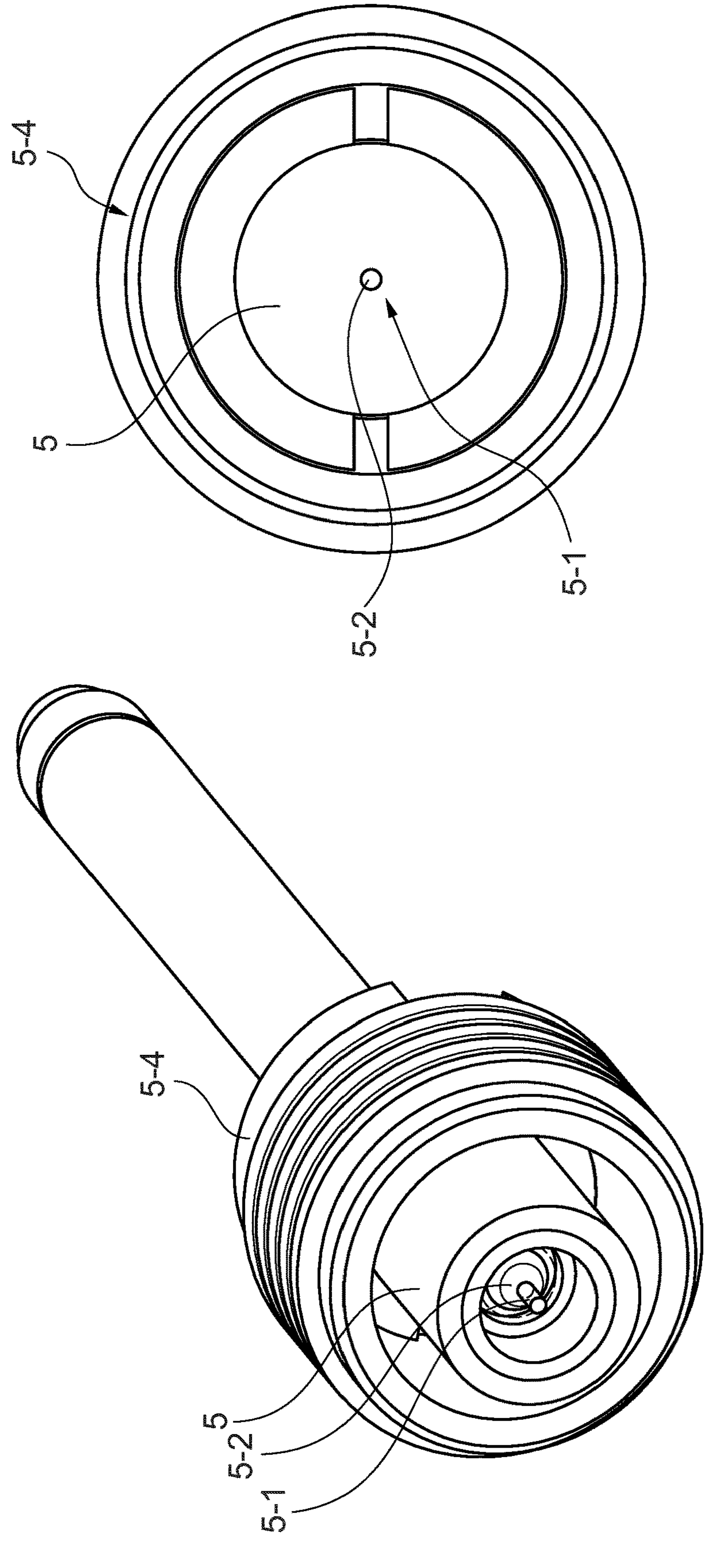
FIG. 10: shows two views 10*a* and 10*b*, view 10*a* is a perspective view of the valve and the valve mount for mounting the valve to the pin socket, view 10*b* is a head-on schematic view of the valve with the valve mount 5-4, both views shows the outlet channel of the valve and the valve ball, view 10*b* shows the section of the valve ball that is visible through the outlet channel of the valve.

FIG. 10 shows two views 10*a* and 10*b*, view 10*a* is a perspective view of the valve 5 and the valve mount 5-4 for mounting the valve to the pin socket 3-1, which is not shown. Shown is the outlet channel 5-1 of the valve 5 ending in the fluid dispensing cavity 8, which is not shown, and the valve ball 5-2. View 10*b* is a head-on schematic view of the valve 5 with the valve mount 5-4, shown is the outlet channel 5-1 of the valve 5 and the part of the valve ball 5-2 which is visible from the outside of the valve 5 through the outlet channel 5-1.

Figure 11:
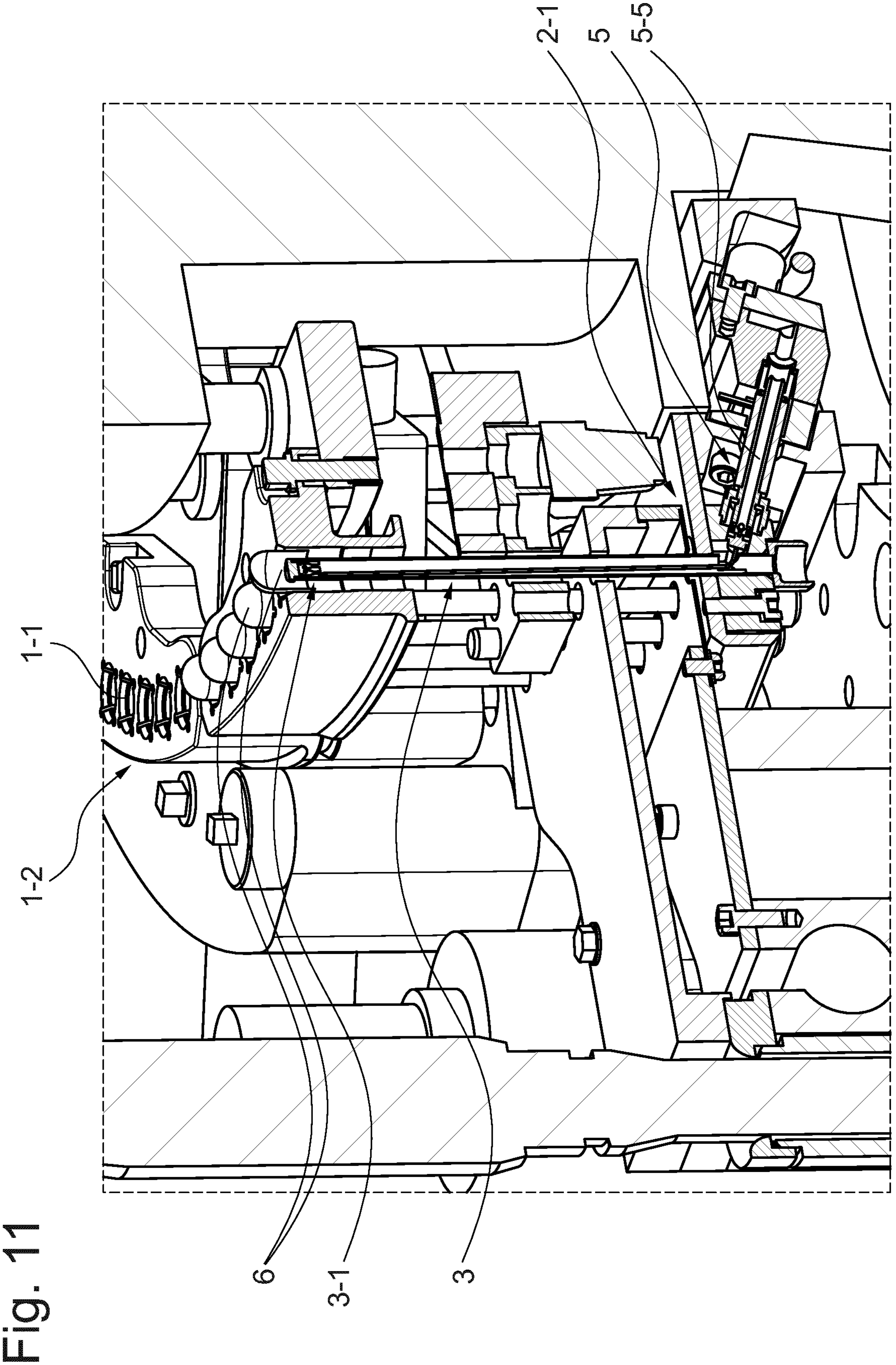
FIG. 11: shows an enlarged perspective view of a cross section of a part of APP with the valve and the array of pins with the mounting plate of the array of pins for mounting the pins in the array of pins. The pins are in a position wherein the pin head is inserted into the cavity of a cap of a capsule shell and are in a position for dispensing a droplet of FLU. The cap is held in a holder, and several holders filled with caps and empty holders are arranged and mounted in a ring of holders.

FIG. 11 shows an enlarged perspective view of a cross section of a part of APP 1 with the valve 5 and the valve cavity 5-5 and the array of pins 2 with the mounting plate 2-1 of the array of pins 2 for mounting the pins 3 in the array of pins. The pins 3 are in a position wherein the pin head 3-1 is inserted into the cavity of a cap 6 of a capsule shell and are in a position for dispensing a droplet of FLU. The cap 6 is held in a holder 1-1, and several holders 1-1 filled with caps 6 and empty holders 1-1 are arranged and mounted in a ring 1-2 of holders 1-1.

Figure 12:
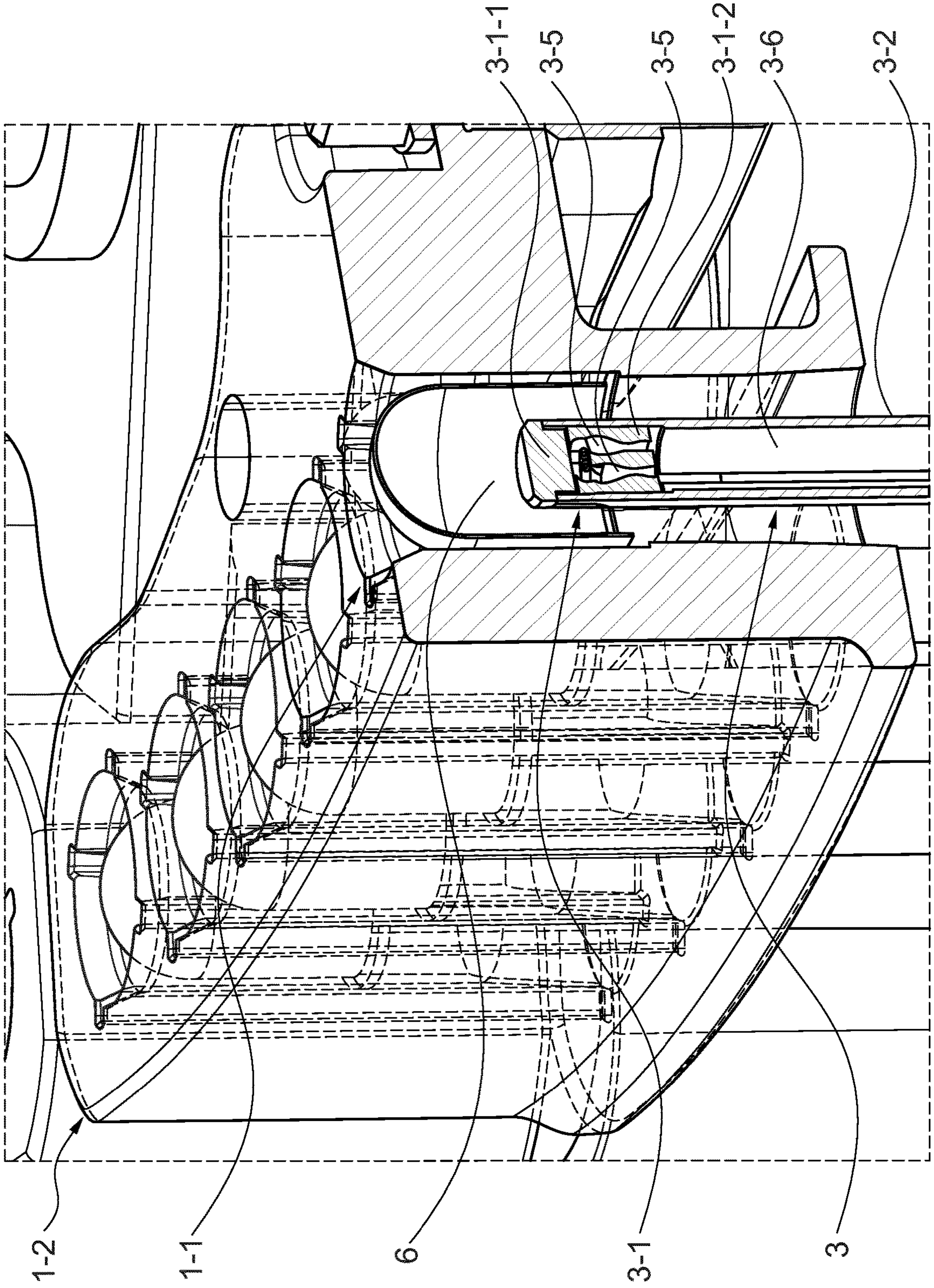
FIG. 12: shows an enlarged section of the perspective view of FIG. 11 with the pin head positioned in the cap of a capsule shell. The cap is held in a holder, and several holders filled with caps are arranged and mounted in a ring of holders.

FIG. 12 shows an enlarged section of the perspective view of a cross section of a part of APP of FIG. 11 with the pin 3, whose the pin head 3-1 positioned in the cavity of a cap 6 of a capsule shell. The cap 6 is held in a holder 1-1, and several holders 1-1 filled with caps 6 are arranged and mounted in a ring 1-2 of holders 1-1. Also the cross section of the pin head closure cap 3-1-1, mount 3-1-2 in the pin head for fixing the position of the cannula, two pin head gas openings 3-5 in the mount 3-1-2 and empty pin space 3-6 in the pin tube 3-2 are shown. The pin head gas opening 3-5 opens on the lower side into the empty pin space 3-6.

Figure 13:
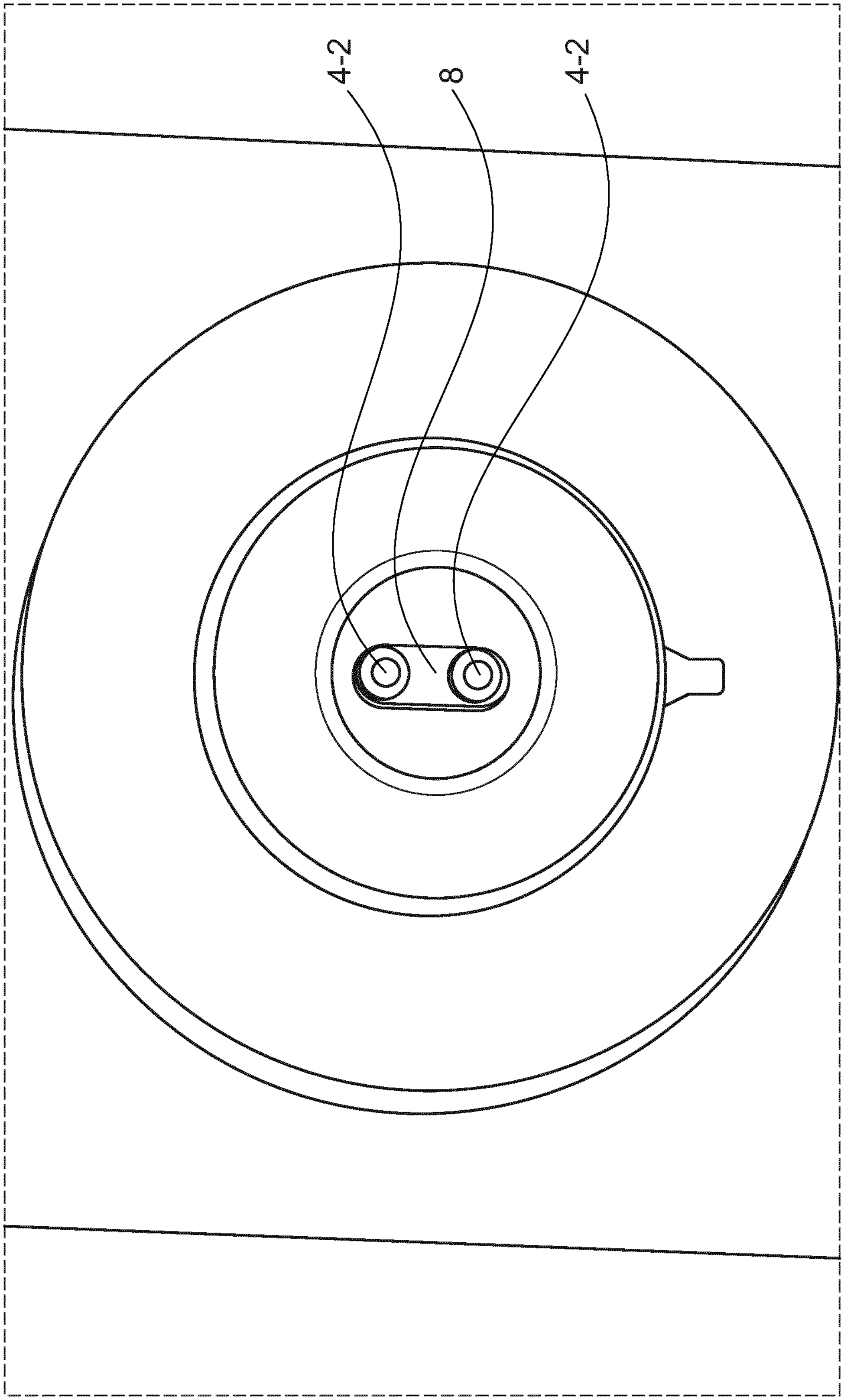
FIG. 13: shows a head-on photograph of the fluid dispensing cavity with two cannulas leaving from the fluid dispensing cavity.

FIG. 13 shows a head-on photograph of the fluid dispensing cavity 8 with the openings 4-2 of two cannula opening into the fluid dispensing cavity 8.

Figure 14:
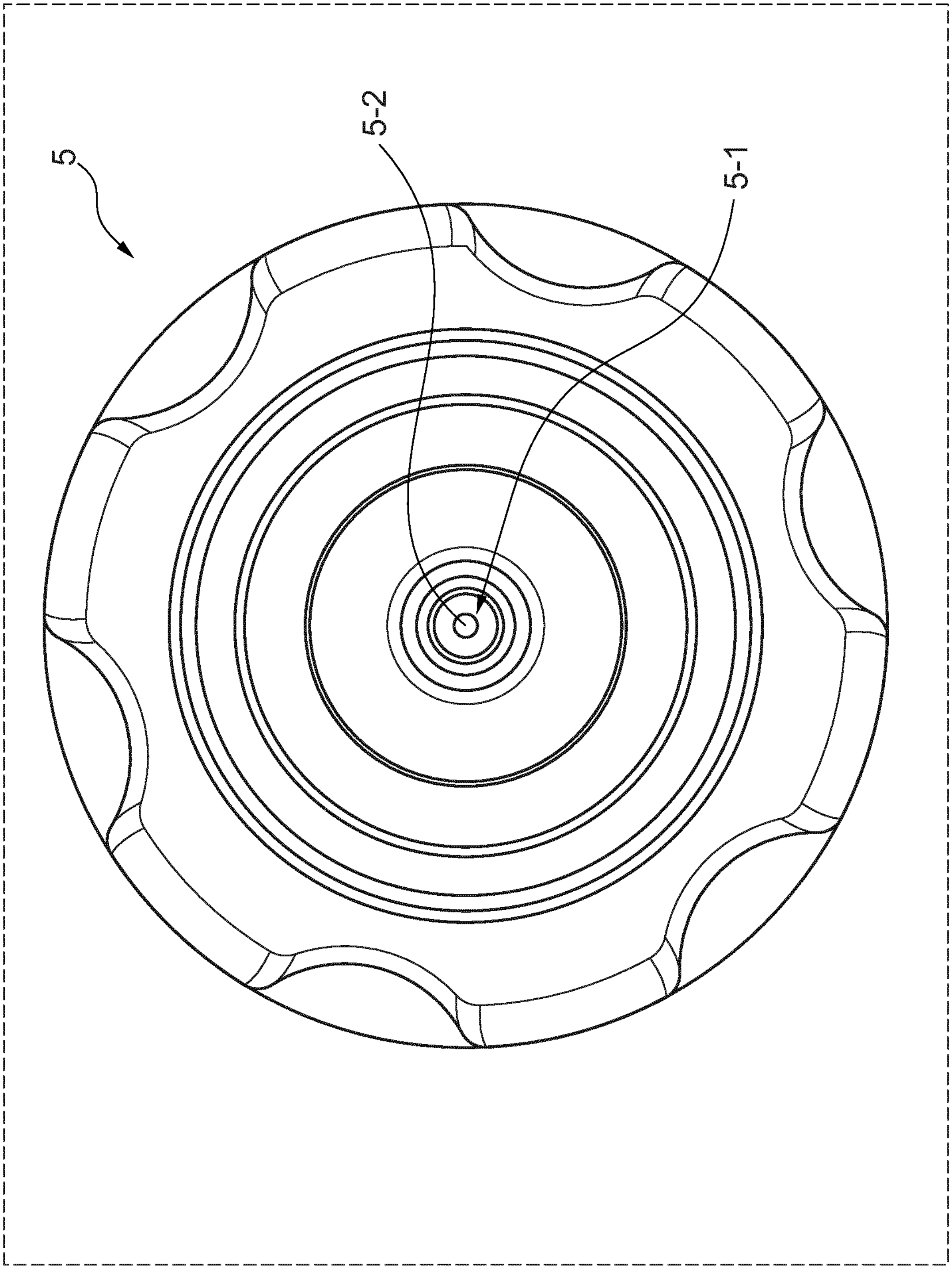
FIG. 14: shows a head-on photograph of the valve, the valve mount for mounting the valve to the pin socket, the outlet channel of the valve ending in the fluid dispensing cavity and the section of the valve ball that is visible through the outlet channel.

FIG. 14 shows a head-on photograph of the valve 5; also shown the outlet channel 5-1 of the valve 5 ending in the fluid dispensing cavity 8, which is not shown, and the section of the valve ball 5-2 that is visible through the outlet channel 5-1.

Figure 15:
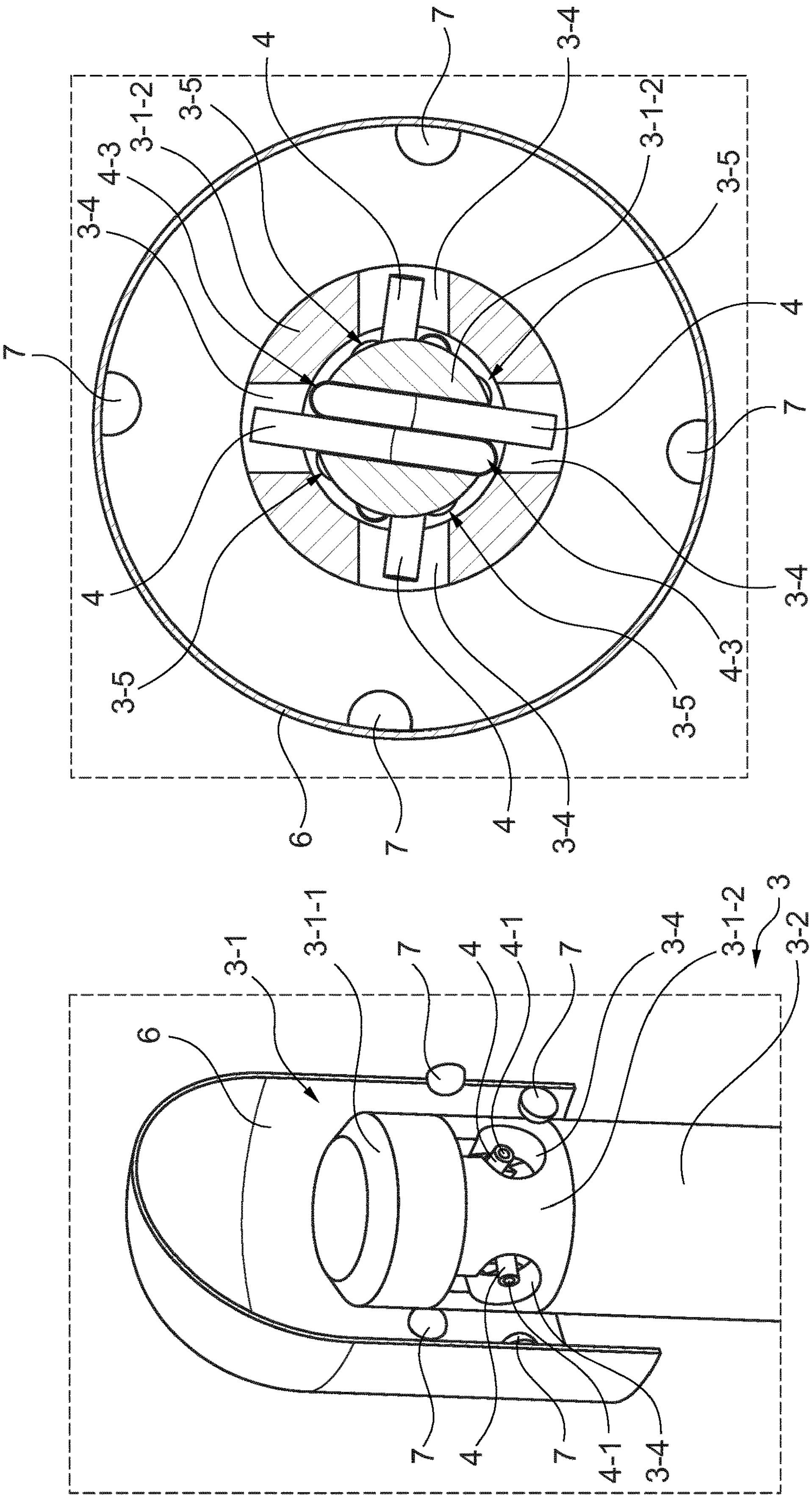
FIG. 15: shows two views 15*a* and 15*b*, view 15*a* is a perspective view and view 15*b* is a top view of a pin head with four cannulas.

FIG. 15 shows two views 15*a* and 15*b*, view 15*a* is a perspective view and view 15*b* is a top view of a pin head 3-1 with four cannulas 4. Shown in view 15*a* is the pin head 3-1 of the pin 3 with its pin tube 3-2, the pin head 3-1 is shown with pin head closure cap 3-1-1 and the mount 3-1-2 in the pin head 3-1 for fixing the position of the cannulas 4; the end of the cannulas 4 are located in the pin head opening 3-4 comprising an open space separating the end of the cannula with its opening 4-1 circumferentially from the wall of the pin head; also shown are four droplets 7 which are located on the inner surface of the cap 6, which is not shown. View 15*b* shows the four cannula 4 in the pin head 3-1, fixed by the mount 3-1-2 in the pin head, again the end of the cannulas 4 are located in the pin head opening 3-4 comprising an open space separating the end of the cannula with its opening 4-1 circumferentially from the wall of the pin head 3-1, also shown for two cannulas are the bending 4-3 of the cannulas. Also shown are four droplets 7 which are located on the inner surface of the cap 6. The pin head opening 3-4 is in fluid connection with the four pin head gas opening 3-5.

Figure 16:
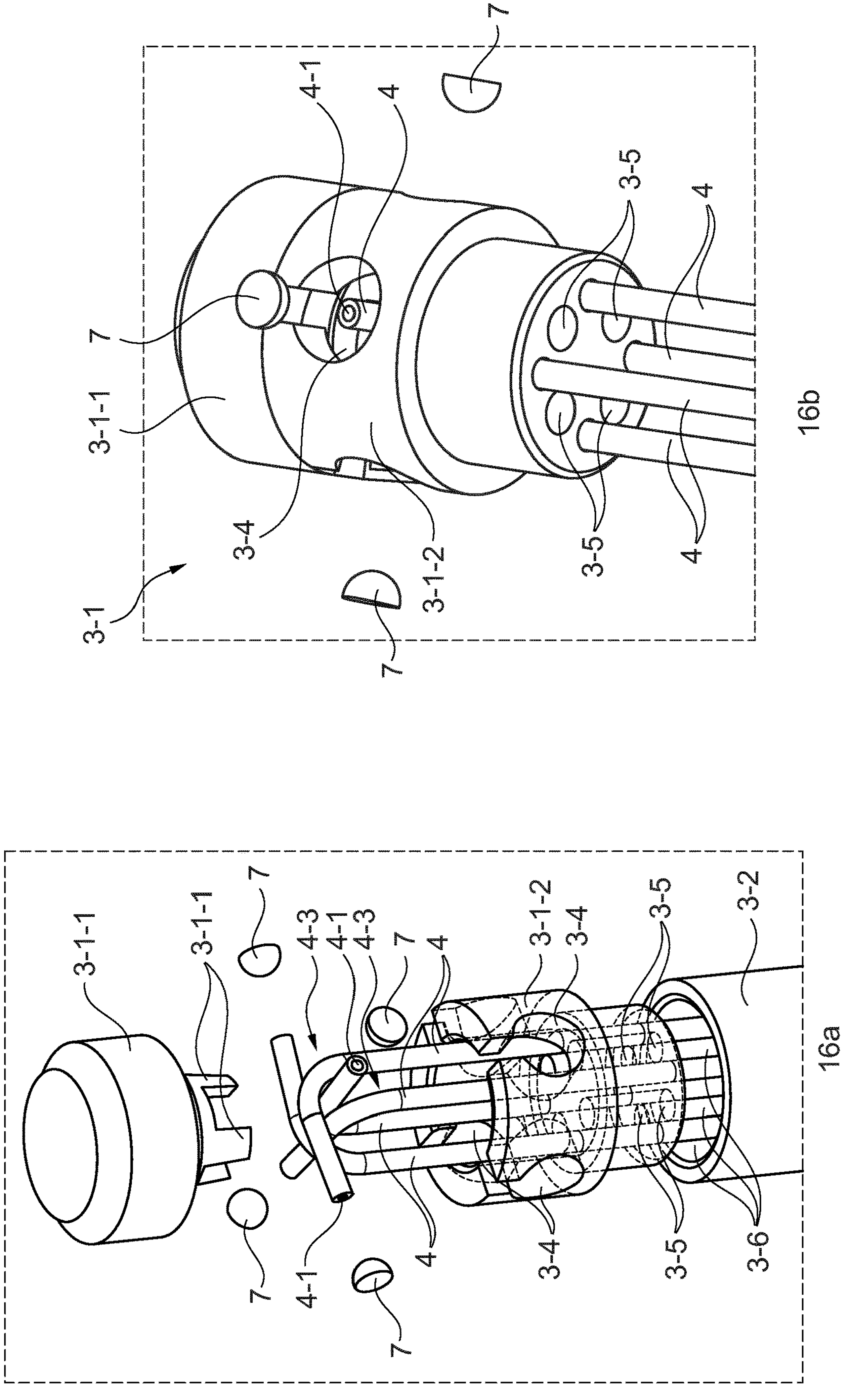
FIG. 16: shows in the view 16*a* an exploded and perspective view of a pin head with four cannulas and with four droplets positioned on the inside of a cap of a capsule, but without showing the cap itself, in the view 16*b* a schematic and perspective view of a pin head with four cannulas and with three droplets positioned on the inside of a cap of a capsule, but without showing the cap itself.

FIG. 16 shows in the view 16*a* an exploded and perspective view of a pin head 3-1 with four cannulas 4 and with four droplets 7 positioned on the inside of a cap 6, but without showing the cap 6 itself. The exploded view 16*a* illustrates how the parts pin tube 3-2, mount 3-1-2 in the pin head, the four cannulas 4 with their bendings 4-3 and the pin head closure cap 3-1-1 fit together: The mount 3-1-2 in the pin head slides with its lower end into the pin tube 3-2, the pin head closure cap slides with it lower end, which comprise holding means for fixing the ends of the four cannulas 4, and thereby the openings 4-1 of the cannulas 4 at the end of the cannula for ejecting the droplet in the correct position, in the pin head 3-1. In the mount 3-1-2 in the pin head are shown the passage of the four cannulas 4 through respective bores in the mount 3-1-2, which fix the four cannulas 4 in the correct position in the pin head, also shown are four pin head gas openings 3-5 in form of bores in the pin head mount 3-1-2, which bring the empty pin space 3-6 in fluid connection with the four open spaces in pin head openings 3-4 separating the end of each of the four cannulas 4 with its opening 4-1 circumferentially from the wall of the pin head 3-1. Also shown are the pin head openings 3-4 comprising an open space separating the end of the cannula with its opening 4-1 circumferentially from the wall of the pin head.

In the view 16*b* a schematic and perspective view of a mount 3-1-2 of a pin head 3-1 with four cannulas 4 is shown. Also shown are three droplets 7 positioned on the inside of a cap 6, but without showing the cap itself. The four cannulas 4 pass through the pin head mount 3-1-2 which comprises also the four pin head gas openings 3-5 in form of bores in the pin head mount 3-1-2. The pin head 3-1 is closed by the pin head closure cap 3-1-1. Again the end of each cannula 4 with its opening 4-1 is located in the pin head opening 3-4 comprising an open space separating the end of each cannula 4 with its opening 4-1 circumferentially from the wall of the pin head 3-1

Figure 17:
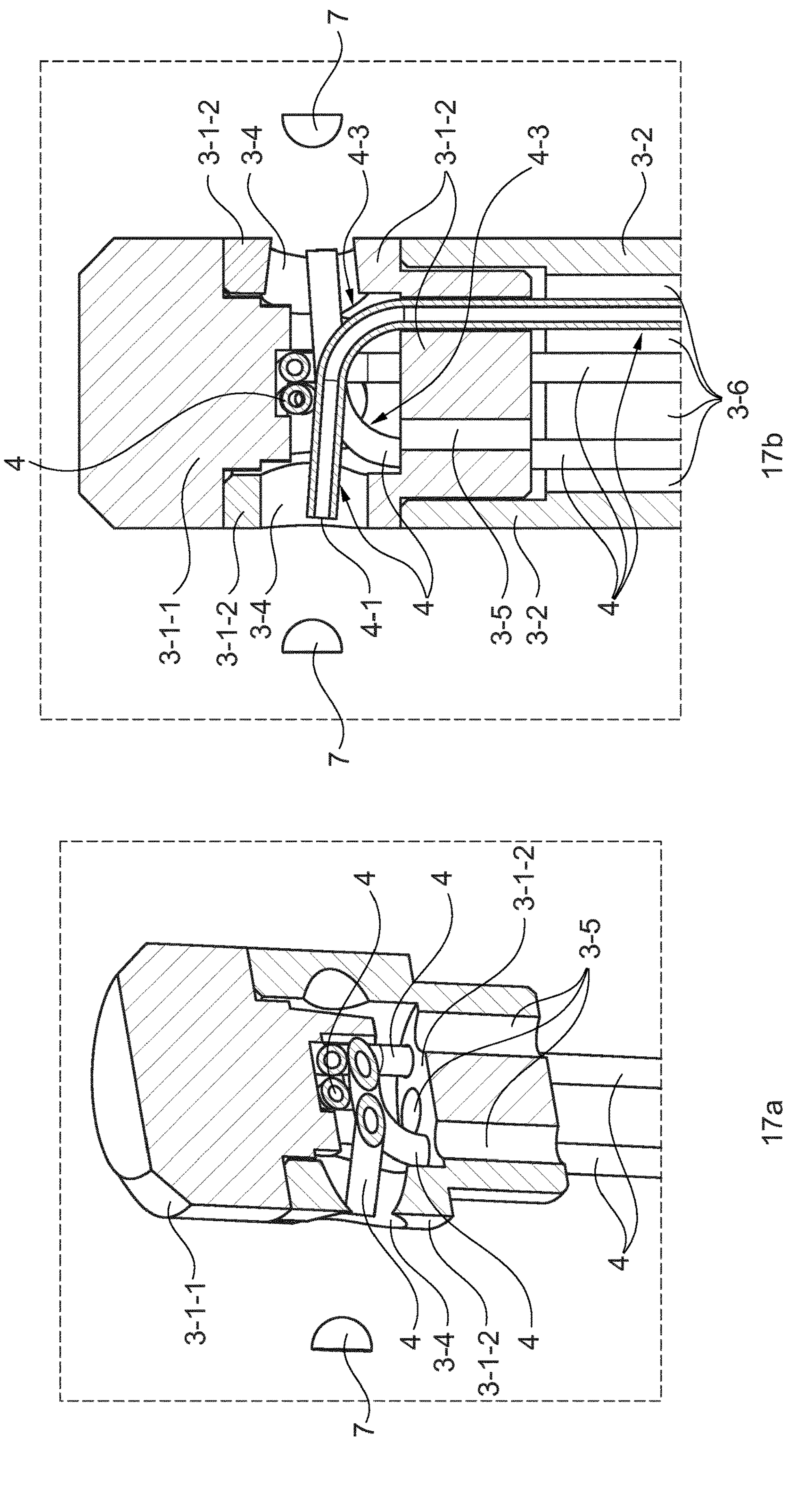
FIG. 17: shows in the view 17*a* a schematic and perspective cross section of the pin head with four cannulas, the cross section is done through a plane perpendicular to the surface of the pin and along the longitudinal axis of the pin cutting through the middle of the pin head; the view 17*b* shows a schematic cross section of a side view of the pin head with four cannulas, the cross section is done through a plane perpendicular to the surface of the pin and along the longitudinal axis of the pin cutting through the middle of the pin head; view 17*a* shows one and 17*b* shows two droplets positioned on the inside of a cap of a capsule, but without showing the cap itself.

FIG. 17 shows in the view 17*a* a schematic and perspective cross section of the pin head 3-1 with four cannulas 4, the cross section is done through a plane perpendicular to the surface of the pin 3 and along the longitudinal axis of the pin 3 cutting through the middle of the pin head 3-1. Thereby only two the cannulas 4 are shown extending into the pin tube, which is not shown. The pin head closure cap 3-1-2 abutting the mount 3-1-2 closes the pin head 3-1, two of the four pin head gas openings 3-5 in form of bores in the pin head mount 3-1-2 are shown in a cross cut display, a third is shown from the top. One of the four pin head openings 3-4 is shown in a cross but display comprising an open space separating the end of the cannula 4 with its opening 4-1 circumferentially from the wall of the pin head 3-1, and the respective droplet 7 is shown which was elected from this end of the cannula 4 and is sitting on the inner surface of the cap 6, but without showing the cap 6 itself.

The view 17*b* shows a schematic cross section of a side view of the assembled pin head 3-1 with four cannulas 4, the cross section is again as in view 17*a* done through a plane perpendicular to the surface of the pin 3 and along the longitudinal axis of the pin 3 cutting through the middle of the pin head 3-1. View 17*b* shows two droplets 7 positioned on the inside of a cap 6, but without showing the cap 6 itself. The pin head 3-1 comprises the pin head closure cap 3-1-1 fixed to and abutting the mount 3-1-2 in the pin head, the mount 3-1-2 is fixed on and abutting the pin tube 3-2. The mount 3-1-2 fixes the position of the four cannulas 4, of which one is shown in a cross cut display with its opening 4-1 at its end, further two cannulas 4 with their bending 4-3 are shown passing through the pin head mount on the back side of the one cannula shown in cross cut display, and of the fourth cannula 4 only the cross cut section of the end of the cannula 4 is shown which extends to the back of the pin head 3-1. One of pin head gas opening 3-5 is shown as a cross cut through the respective bore and thereby connecting the empty pin space 3-6 with the pin head openings 3-4. The two cannulas which are shown with their bending 4-3 end in their respective pin head openings 3-4 which are shown in a cross cut display comprising an open space separating the end of the cannula 4 with its opening 4-1 circumferentially from the wall of the pin head 3-1.

Figure 18:
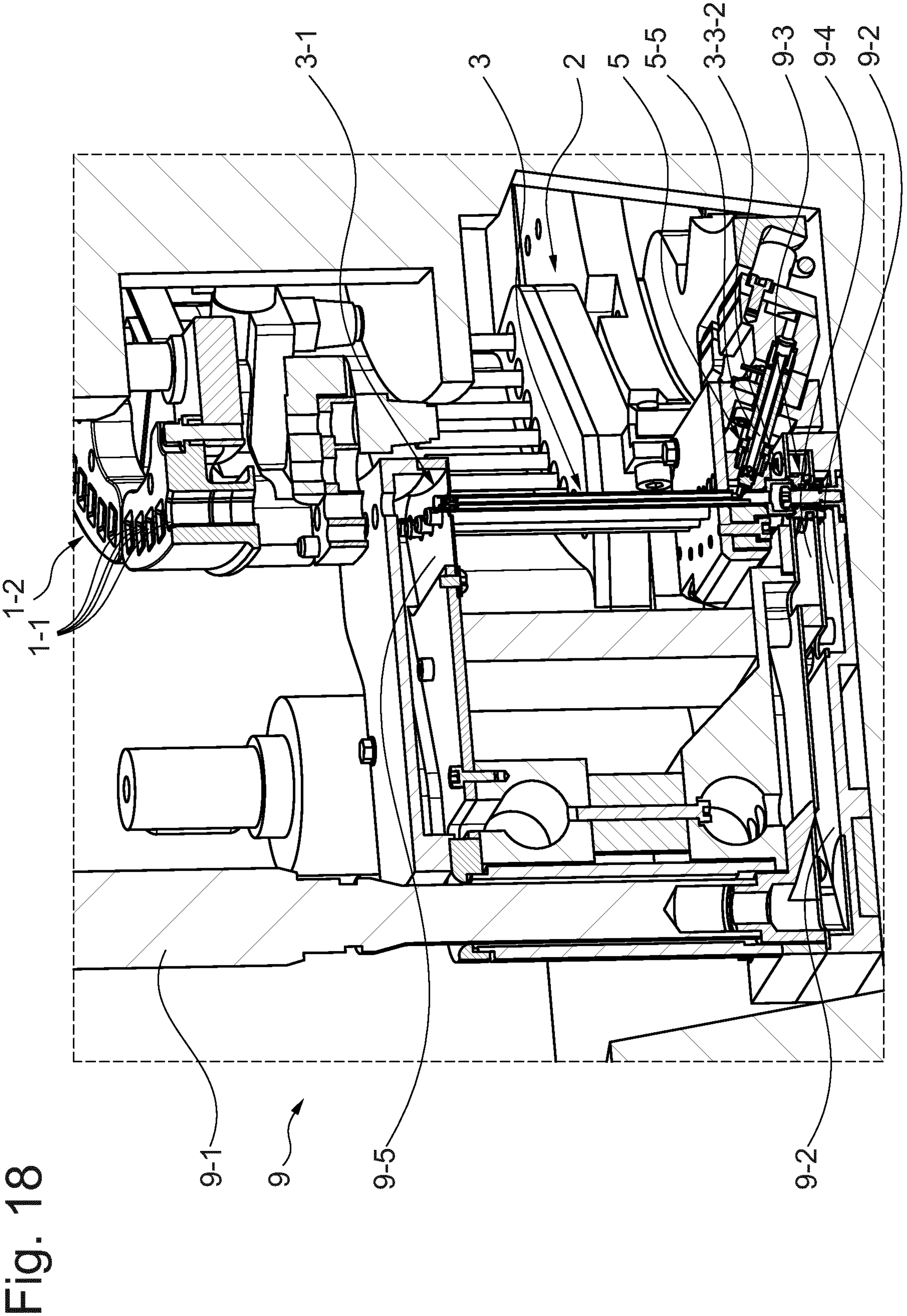
FIG. 18: shows a cross cut section of part of APP with the tempering system of APP: the device for supplying tempered gas, the gas inlet channel, the gas inlet splitter, the gas bypass outlet channel, the gas tempering outlet channel and the foot of the pin socket. Also shown are the pin with its pin head, the array of pins, the valve, and the valve cavity. Several empty holders are arranged and mounted in a ring of holders.

FIG. 18 shows a cross cut section of part of APP with the tempering system of APP: the device 9-1 for supplying tempered gas, the gas inlet channel 9-2, the gas inlet splitter 9-3, the gas bypass outlet channel 9-4, the gas tempering outlet channel 9-5 and the foot of the pin socket 3-3-2. Also shown are the pin 3 with its pin head 3-1, the array of pins 2, the valve 5, and the valve cavity 5-5. Several empty holders 1-1 are arranged and mounted in a ring 1-2 of holders 1-1.

Figure 19:
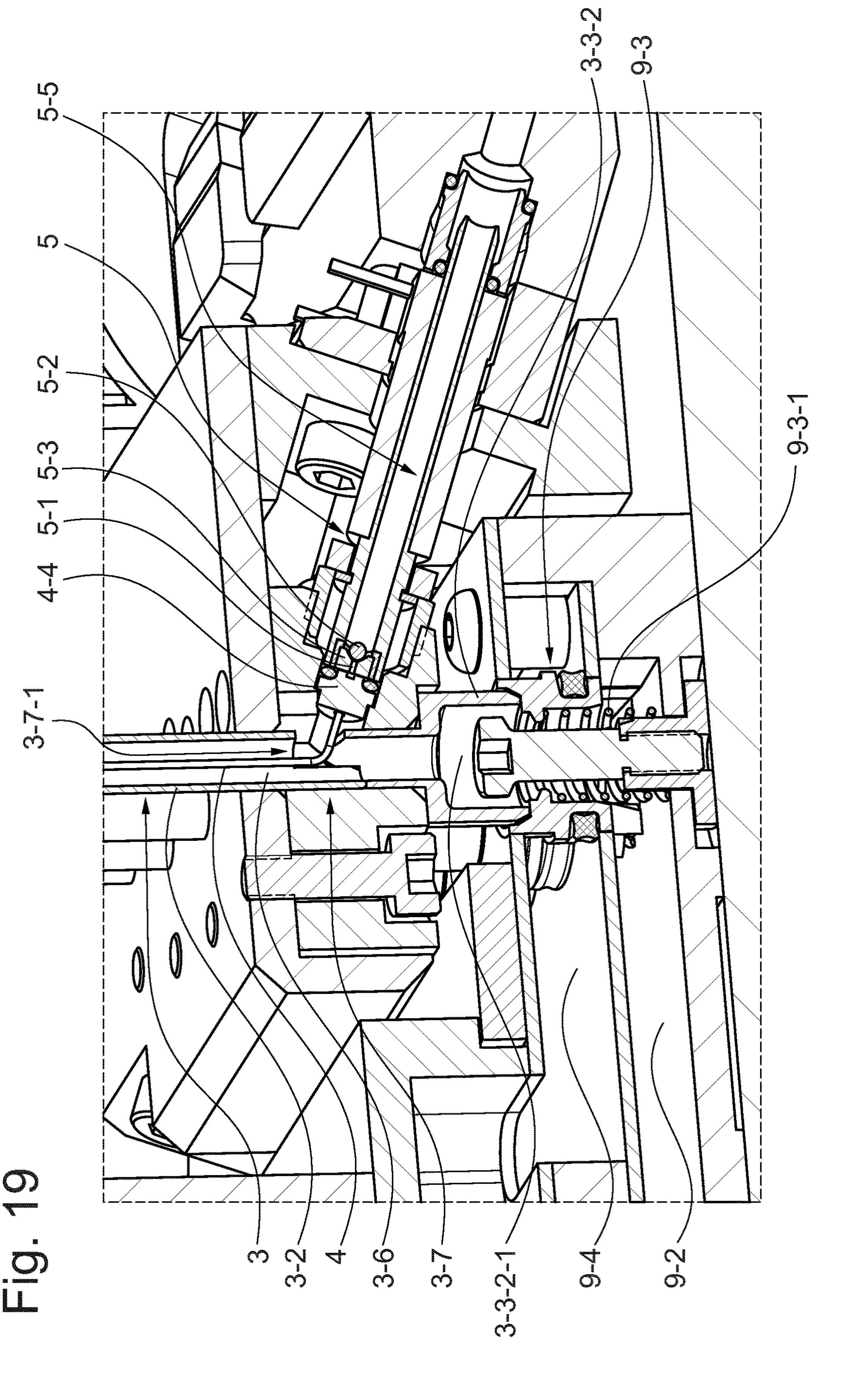
FIG. 19: shows an enlarged view of the part of the cross cut section of FIG. 18 with the gas inlet splitter: the gas inlet channel, the gas inlet splitter, the spring of the gas inlet splitter, the gas bypass outlet channel, the foot of the pin socket, and the opening in the foot of the pin socket; with the gas inlet splitter in SPLITTERTEMPER. Also shown are part of the pin, the pin tube, the cannula, the cannula mount, the empty pin space, the pin foot, the opening in the pin foot, the valve, the valve cavity, the outlet channel of the valve ending in the fluid dispensing cavity, the valve ball, and the valve seat.

FIG. 19 shows an enlarged view of the part of the cross cut section of FIG. 18 with the gas inlet splitter 9-3: the gas inlet channel 9-2, the gas inlet splitter 9-3, the spring of the gas inlet splitter 9-3-1, the gas bypass outlet channel 9-4, the foot 3-3-2 of the pin socket, and the opening 3-3-2-1 in the foot 3-3-2 of the pin socket; with the gas inlet splitter 9-3 in SPLITTERTEMPER and the foot of the pin socket 3-3-2 in PINTEMPER. The foot of the pin socket 3-3-2 abuts the gas inlet splitter 9-3. Also shown are part of the pin 3, the pin tube 3-2, the cannula 4, the cannula mount 4-4, the empty pin space 3-6, the pin foot 3-7, the opening 3-7-1 in the pin foot 3-7, the valve 5, the valve cavity 5-5, the outlet channel 5-1 of the valve 5 ending in the fluid dispensing cavity 8, the valve ball 5-2, and the valve seat 5-3.

The gas inlet channel 9-2, the gas inlet splitter 9-3, the opening 3-3-2-1 in the foot 3-3-2 of the pin socket 3-3, the opening 3-7-1 in the pin foot 3-7 and the empty pin space 3-6 are in fluid connection, gas with the desired temperature can pass through.

Figure 20:
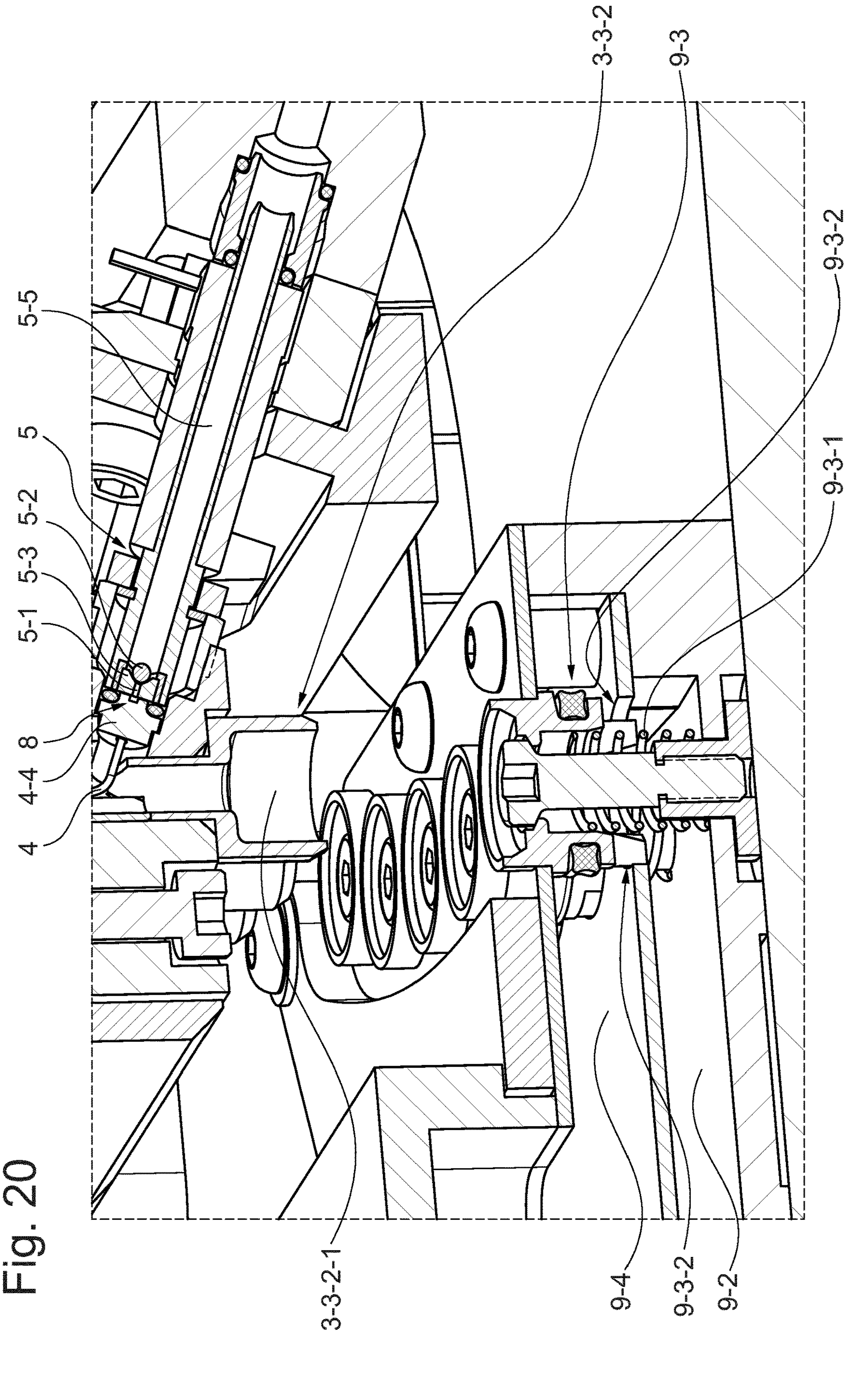
FIG. 20: shows an enlarged view of the part of the cross cut section of FIG. 18 with the gas inlet splitter: the gas inlet channel, the gas inlet splitter, the spring of the gas inlet splitter, the gas bypass outlet channel, the foot of the pin socket, and the opening in the foot of the pin socket; with the gas inlet splitter in SPLITTERBYPASS. Also shown are the cannula, the cannula mount, the fluid dispensing cavity, the valve, the valve cavity, the outlet channel of the valve ending in the fluid dispensing cavity, the valve ball, and the valve seat.

FIG. 20 shows an enlarged view of the part of the cross cut section of FIG. 18 with the gas inlet splitter 9-3: the gas inlet channel 9-2, the gas inlet splitter 9-3, the spring 9-3-1 of the gas inlet splitter 9-3, the gas bypass outlet channel 9-4, the foot 3-3-2 of the pin socket, and the opening 3-3-2-1 in the foot of the pin socket; with the gas inlet splitter 9-3 in SPLITTERBYPASS and the foot of the pin socket 3-3-2 in PINDISPENSE. Also shown are the cannula 4, the cannula mount 4-4, the fluid dispensing cavity 8, the valve 5, the valve cavity 5-5, the outlet channel 5-1 of the valve 5 ending in the fluid dispensing cavity 8, the valve ball 5-2, and the valve seat 5-3.

The spring 9-3-1- of the gas inlet splitter 9-3 holds the gas inlet splitter in SPLITTERBYPASS. The gas inlet channel 9-2, the gas inlet splitter 9-3 and the gas bypass outlet channel 9-4 are in fluid connection via an opening 9-3-2 which connects the gas inlet channel with the gas bypass outlet channel when the gas inlet splitter is in SPLITTERBYPASS, gas with the desired temperature can pass through. The pin socket 3-3-2 does not abut the gas inlet splitter 9-3, but is moved a certain distance upwards away from the gas inlet splitter 9-3.

Figure 21:
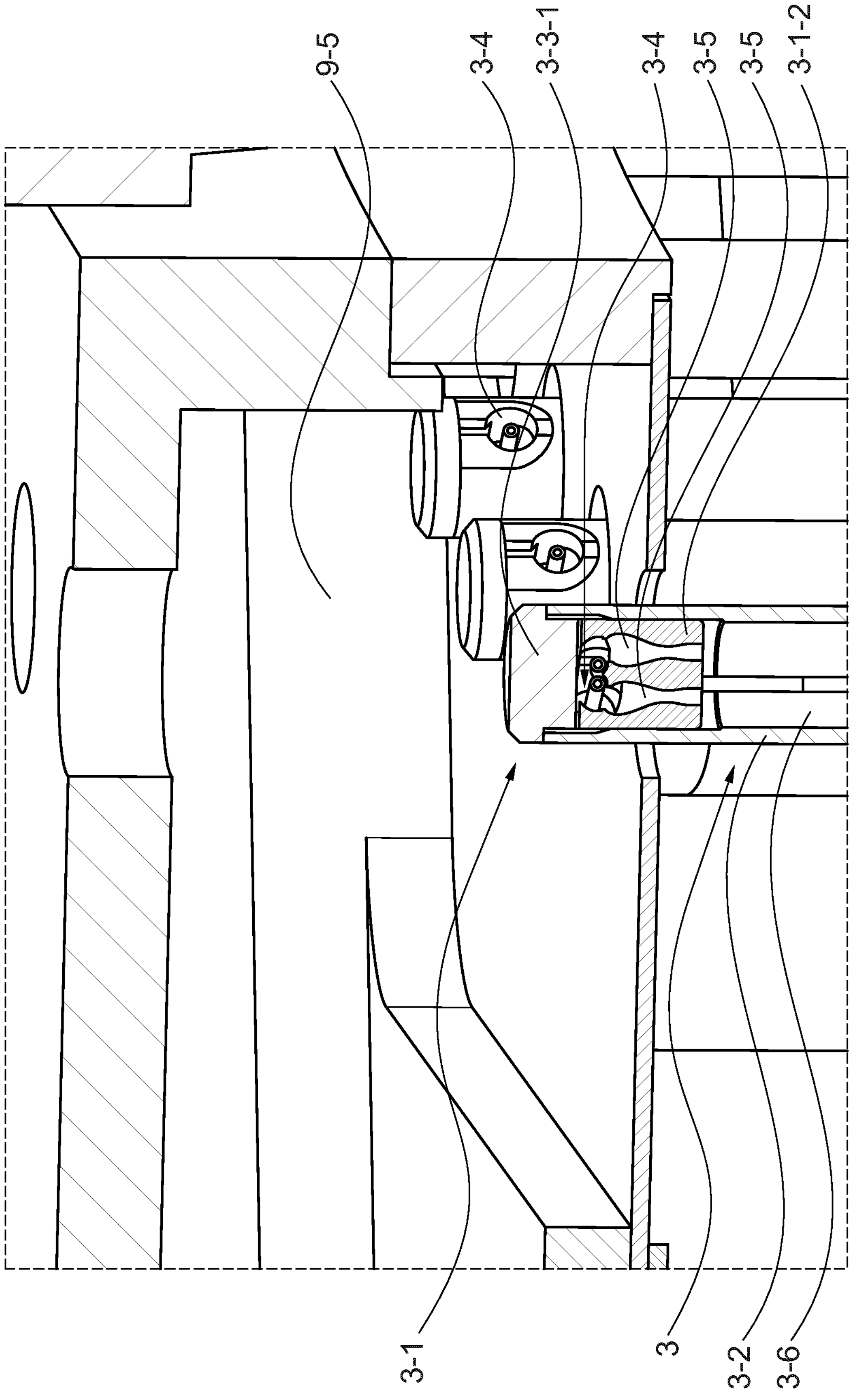
FIG. 21: shows another enlarged view of part of the cross cut section of FIG. 18 with the pin head in tempering position: part of the pin, the pin head with its pin head closure cap, with the mount in the pin head, with the pin head gas opening and with the pin head opening, further the pin tube with the empty pin space, and the gas tempering outlet channel.

FIG. 21 shows another enlarged view of part of the cross cut section of FIG. 18 with the pin head 3-1 in PINTEMPER: part of the pin 3, the pin head 3-1 with its pin head closure cap 3-1-1, with the mount 3-1-2 in the pin head, with the pin head gas opening 3-5 and with the pin head opening 3-4, further the pin tube 3-2 with the empty pin space 3-6, and the gas tempering outlet channel 9-5.

The empty space 3-6, the pin head gas openings 3-5, the pin head opening 3-4 and the gas tempering outlet channel are in fluid connection, gas with the desired temperature can pass through.

EXAMPLES

Materials and dimensions

- Capsules The capsules used had an essentially hollow-cylindrical shape with dome shaped closed ends and consists of two parts, a cap and a body, which telescopically engage with each other for closing the capsule. The telescopic engagement of the cap and the body when the capsule is closed, is realized in form of an overlap of a part of the cap over a part of the body. In this region of overlap there may be a snap fit ring in the cap, which is located in the cylindrical part of the cap and is located at a certain distance from the edge of the open end of the cap.

Dimensions of parts of the filling machine were (if not stated expressly otherwise in an example):

- Cannula OD: 0.413 mm, ID: 0.21 mm
- pin tube OD 4.0 mm, ID 3.0 mm, thickness of the wall of the pin tube is 0.5 mm
- Pressure FLU in the valve cavity was under pressure of 1.5 bar
- V-OUTLETCHAN 0.07 microliter
- V-CAV 0.18 microliter
- Plantcaps® capsules produced from tapioca pullulan; Capsugel, now Lonza Ltd, Morristown, New Jersey, USA
- Vcaps® capsules made from HPMC; Capsugel, now Lonza Ltd, Morristown, New Jersey, USA
- Vcaps® Enteric Two-piece hard capsule manufactured with pharmaceutical-grade cellulosic derivatives (HPMCAS, HPMC); Capsugel, now Lonza Ltd, Morristown, New Jersey, USA
- Vcaps® Plus immediate release capsule for pharmaceutical products in HPMC; Capsugel, now Lonza Ltd, Morristown, New Jersey, USA

Example 1

Vcaps® Plus size 0 capsule are used. On a filling machine two droplets of a 75 wt % ethanol/25 wt % de-ionized water mixture 23° C. are dispensed on the inner surface of the cap of each capsule using two cannulas per pin tube. The droplets of 0.15 microliter (valve opening time: 2 msec) are dispensed 180° from each other in between the snap fit ring and the cap edge. In a next step the filling machine inserts the body into the cap up to a fully closed position. As a result the mixture is spread-out and local sealing zones are formed between the cap and the body. The seal zones increase the pull-apart force compared to the baseline with a factor 5 without any visual outer defects.

Example 2

Vcaps® Enteric size 0 capsules are used. On a filling machine two droplets of 99 wt % ethanol of 23° C. are dispensed on the inner surface of the cap of each capsule using two cannulas per pin tube. The droplets of 0.1 microliter (valve opening time 1 msec) are dispensed 180° degrees from each other in between the snap fit ring and the cap edge. In a next step the filling machine inserts the body into the cap up to a fully locked position. As a result the mixture is spread-out and local sealing zones are formed between the cap and the body. The seal zones increase the pull-apart force compared to the baseline with a factor 10 without any visual outer defects.

Example 3

Plantcaps® size 0 capsules are used. On a filling machine four droplets of a 25 wt % ethanol/75 wt % de-ionized water mixture of 23° C. are dispensed on the inner surface of the cap of each capsule using two cannulas per pin tube. The droplets of 0.05 microliter (valve opening time 1 msec) are dispensed 180° from each other in between the snap fit ring and the cap edge. In a next step the filling machine inserts the body into the cap up to a fully locked position. As a result of the formulation point-seals are formed between the cap and the body. The point-seals increase the pull-apart force compared to the baseline with a factor 8 without any visual outer defects.

Example 4

Hard gelatin size 0 capsules are used. On a filling machine four droplets of de-ionized water of 70° C. are dispensed on the inner surface of the cap of each capsule using four cannulas per pin tube. The droplets of 0.25 microliter (valve opening time 2 msec) are dispensed 90° from each other in between the snap fit ring and the cap edge. In a next step the filling machine inserts the body into the cap up to a fully locked position. As a result the mixture is spread-out and local sealing zones are formed between the cap and the body. The point-seal increases the pull-apart force compared to the baseline with a factor 4 without any visual outer defects.

Example 5

Vcaps® size 0 capsules are used.

On a filling machine four droplets of de-ionized water of ca. 65° C. are dispensed on the inner surface of the cap of each capsule using four cannulas per pin tube. The droplets of 0.2 microliter (valve opening time 2 msec) are dispensed 90° from each other in between the snap fit ring and the cap edge. In a next step the filling machine inserts the body into the cap up to a fully locked position. As a result of the formulation point-seals are formed between the cap and the body. The point-seals increase the pull-apart force compared to the baseline with a factor 5 without any visual outer defects.

LIST OF REFERENCE NUMERALS

1 APP
1-1 holder for holding a cap or a body of a capsule
1-2 ring of holders
2 array of pins
2-1 mounting plate of the array of pins for mounting the pins in the array of pins
3 pin
3-1 pin head
3-1-1 pin head closure cap

3-1-1-1 holding means of the pin head closure cap for fixing the ends of the four cannulas 4 in the correct position in the pin head
3-1-2 mount in the pin head for fixing the position of the cannula
3-2 pin tube which forms the pin
3-3 pin socket in which the pin is mounted
3-3-1 inner thread in the pin socket with which the valve is mounted by the valve mount to the pin socket by a screw type connection
3-3-2 foot of the pin socket
3-3-2-1 opening in the foot of the pin socket
3-4 pin head opening comprising an open space separating the end of the cannula with its opening circumferentially from the wall of the pin head
3-5 pin head gas opening
3-6 empty pin space
3-7 pin foot
3-7-1 opening in the pin foot
4 cannula
4-1 opening of the cannula at the end of the cannula for ejecting the droplet
4-2 opening of the cannula which is opening into the fluid dispensing cavity
4-3 bending of the cannula
4-4 cannula mount
5 valve
5-1 outlet channel of the valve ending in the fluid dispensing cavity
5-2 valve ball
5-3 valve seat
5-4 valve mount for mounting the valve to the pin socket
5-5 valve cavity containing FLU under pressure
6 cap of a capsule shell
7 droplet of FLU
8 fluid dispensing cavity
9 tempering system
9-1 device for supplying tempered gas
9-2 gas inlet channel
9-3 gas inlet splitter
9-3-1 spring of the gas inlet splitter
9-3-2 opening which connects the gas inlet channel with the gas bypass outlet channel when the gas inlet splitter is in SPLITTERBYPASS
9-4 gas bypass outlet channel
9-5 gas tempering outlet channel

The invention claimed is:

1. A device for dispensing a droplet of a fluid onto an inner surface of a cap or onto an inner surface of a body of a capsule, comprising:

a valve comprising an outlet channel with an open end;
a fluid dispensing cavity; and
a cannula comprising a tube with two ends that are open,
wherein the open end of the outlet channel of the valve opens into the fluid dispensing cavity,
wherein a first end of the two ends of the cannula dispenses the droplet of the fluid, and a second end of the two ends of the cannula opens into the fluid dispensing cavity, and
wherein the device defines a fluid connection from the outlet channel of the valve to the fluid dispensing cavity and from the fluid dispensing cavity to the cannula, and the fluid can flow from the valve to the first end of the cannula via the fluid connection.

2. The device according to claim 1, further comprising:

a pin comprising a pin tube and two ends, a first end of the two ends of the pin comprising a pin head,
wherein the pin tube receives and contains the cannula, and
a portion of the cannula is located in the pin head, the portion of the cannula located in the pin head includes the first end of the cannula.

3. The device according to claim 2, wherein an outer diameter of the pin tube is 15 mm or smaller.

4. The device according to one or more of claim 2, wherein the portion of the cannula in the pin head comprises a bent portion.

5. The device according to claim 4, wherein the bent portion is bent at a bending angle and the bending angle is 40° to 140°.

6. The device according to claim 2, wherein the device comprises a plurality of cannulas.

7. The device according to claim 6, wherein the portion of each of the plurality of cannulas in the pin head comprises a bent portion.

8. The device according to claim 7, wherein the plurality of cannulas are arranged in such a way that openings of the respective first ends, which are located in the pin head, and respective directions of the openings of the first ends are distributed over a circumference of the pin head at the same angle to each other.

9. The device according to claim 8, wherein the plurality of cannulas are two cannulas and the direction of the openings of the first ends, which are located in the pin head, of the two cannulas have an angle of 180° to each other.

10. The device according to claim 8, wherein the plurality of cannulas are four cannulas, and the direction of the openings of the first ends, which are located in the pin head, of the four cannulas have an angle of 90° to each other.

11. The device according to claim 2, wherein the device comprises a means for heating or cooling of the pin, the pin head, the cannula, the fluid dispensing cavity, the valve, or of a combination thereof.

12. The device according to claim 1, wherein a volume of the fluid dispensing cavity is 5 microliter or smaller.

13. The device according to claim 1, wherein an inner diameter of the cannula is 2 mm or smaller.

14. The device according to claim 1, wherein the device comprises only one cannula.

15. The device according to claim 14, wherein the fluid dispensing cavity has a cross-sectional area perpendicular to a longitudinal axis of the cannula, and the cross-sectional area of the fluid dispensing cavity is different from a cross-sectional area of the cannula.

16. The device according to claim 1, wherein the device comprises a means for heating or cooling of the fluid.

17. An apparatus used in a closing process of caps and bodies to form closed capsules or used in an insertion of a tablet or a caplet into a cap or into a body, wherein the apparatus comprises the device of claim 2.

18. The apparatus according to claim 17, wherein the apparatus comprises a device for supplying the fluid into a valve cavity.

19. The apparatus according to claim 17, wherein the apparatus comprises a device for keeping the fluid in a valve cavity under a predefined pressure.

20. The apparatus according to one or more of claim 17, wherein the apparatus comprises a means for heating or cooling of the fluid.

21. The apparatus according to one or more of claim 17, wherein the apparatus comprises a means for heating or cooling of the pin, the pin head, the cannula, the fluid dispensing cavity, the valve, or of a combination thereof.

22. A method for dispensing a droplet of a fluid onto an inner surface of a cap or onto an inner surface of a body of a capsule, wherein the droplet is dispensed by the device of claim 1 and the method comprises:

providing the valve, the outlet channel of the valve, the fluid dispensing cavity and the cannula of the device filled with the fluid with the valve closed and having the fluid in the valve under a predefined pressure;

inserting the pin head into the cavity of the cap or the body;

opening and closing the valve for a predefined period of time to dispense a droplet onto the inner surface of cap or the body; and extracting the pin head from the cavity of the cap or the body.

23. The method according to claim 22, wherein the fluid comprises a solvent, the solvent is selected from the group consisting of water, $C_{1-4}$ alcohol, $C_{1-4}$ ether, $C_{1-8}$ ketones, methylenglycol, $C_{1-4}$ carboxylic acid $C_{1-4}$ ester.

24. The method according to claim 23, wherein the solvent is water, EtOH, isopropanol, or a mixture thereof.

25. The method according to claim 22, wherein the fluid comprises an adhesive agent, the adhesive agent may be selected from a group consisting of polyalkylene, polysaccharide, cellulose and derivatives of cellulose, wax chitosan, carbohydrates including mono-, di-, and poly saccharides, aspartame, glycoside, polyvinylpyrrolidone, gelatin, monofunctional organic acid, polyfunctional organic acid, polymers and copolymers of acrylic acids and methacrylic acids and salts and esters thereof, protein, shellac, rubber, polyvinylacetate, polyuronic acid, poly-hydroxy-alcohol, dialkylphthalate, lower alkyl citrate wherein lower alkyl has 1 to 6 carbon atoms, polyglycol, ester of polyhydroxy-alcohol, reocineoleic acid and esters thereof, long chain fatty acids and long chain esters thereof, wherein long chain fatty acid means 6 to 24 C atoms and long chain ester means an $C_{6-24}$ alcohol ester, or phosphoric acid.

26. The method according to claim 22, wherein the method further comprises:

after extracting the pin head from the cavity of the cap or the body, telescopically engaging the cap and the body to form a capsule.

* * * * *